United States Patent
Byadgi et al.

(10) Patent No.: US 11,050,795 B2
(45) Date of Patent: Jun. 29, 2021

(54) HANDLING INSTANT MESSAGE DISPOSITION NOTIFICATION (IMDN) MESSAGE IN RICH COMMUNICATION SERVICE (RCS) SYSTEM

(71) Applicant: Samsung Electronics Co., Ltd., Suwon-si (KR)

(72) Inventors: Chandrashekhar S Byadgi, Bangalore (IN); Suman Tiwari, Bangalore (IN); Sunil Kumar Nagaraju, Bangalore (IN); Armaan K Marwaha, Bangalore (IN); Ashish Anand, Bangalore (IN); Akhil Goel, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/733,509

(22) PCT Filed: Feb. 15, 2019

(86) PCT No.: PCT/KR2019/001890
§ 371 (c)(1),
(2) Date: Aug. 14, 2020

(87) PCT Pub. No.: WO2019/160380
PCT Pub. Date: Aug. 22, 2019

(65) Prior Publication Data
US 2020/0404025 A1    Dec. 24, 2020

(30) Foreign Application Priority Data

Feb. 15, 2018  (IN) .............................. 201841005859
Feb. 15, 2019  (IN) .............................. 201841005859

(51) Int. Cl.
G06F 15/16    (2006.01)
H04L 29/06    (2006.01)
(Continued)

(52) U.S. Cl.
CPC ...... *H04L 65/1016* (2013.01); *G06F 11/1415* (2013.01); *H04L 51/04* (2013.01);
(Continued)

(58) Field of Classification Search
CPC ...... H04L 65/10; G06F 11/1415; G06F 51/04; G06F 51/10; G06F 51/14; G06F 51/24
See application file for complete search history.

(56) References Cited

U.S. PATENT DOCUMENTS

2005/0187959 A1    8/2005   Jung et al.
2010/0153505 A1    6/2010   Oh et al.
(Continued)

FOREIGN PATENT DOCUMENTS

CN    101588546 A     11/2009
WO    2016185252 A1   11/2016

OTHER PUBLICATIONS

International Search Report and Written Opinion of the International Searching Authority in connection with International Application No. PCT/KR2019/001890 dated May 20, 2019, 8 pages.
(Continued)

*Primary Examiner* — Wing F Chan
*Assistant Examiner* — Joseph R Maniwang

(57) ABSTRACT

Embodiments herein provide a method for handling IMDN message in a RCS system. The method includes sending, by a first electronic device 100*a*, an IMDN restore message to restore a content deleted by the first electronic device 100*a* to at least one second electronic device 100*b*-100*n*. The IMDN restore message comprises an IMDN type with an original IMDN identifier of the deleted content. Further, the method includes receiving, by the at least one second electronic device 100*b*-100*n*, the IMDN message from the first electronic device 100*a*. Further, the method includes determining, by the at least one second electronic device
(Continued)

100*b*-100*n*, the deleted content based on the IMDN identifier. Further, the method includes sending, by the at least one second electronic device 100*b*-100*n*, the deleted content to the first electronic device 100*a*.

15 Claims, 21 Drawing Sheets

(51) Int. Cl.
*G06F 11/14* (2006.01)
*H04L 12/58* (2006.01)
(52) U.S. Cl.
CPC .............. *H04L 51/10* (2013.01); *H04L 51/14* (2013.01); *H04L 51/24* (2013.01)

(56) References Cited

U.S. PATENT DOCUMENTS

| | | |
|---|---|---|
| 2011/0252105 A1 | 10/2011 | Lee et al. |
| 2011/0289431 A1 | 11/2011 | Olumoko et al. |
| 2013/0311431 A1 | 11/2013 | Deepaganesh |
| 2014/0256294 A1 | 9/2014 | Chatterjee et al. |
| 2015/0012930 A1 | 1/2015 | Antell |
| 2016/0124704 A1 | 5/2016 | Kim |
| 2017/0099246 A1 | 4/2017 | Ali et al. |
| 2018/0317064 A1 | 11/2018 | Kim |

OTHER PUBLICATIONS

GSM Association, Official Document RCC.71—RCS Universal Profile Service Definition, Version 1.0, Nov. 16, 2016, 238 pages.

HANDLING INSTANT MESSAGE DISPOSITION NOTIFICATION (IMDN) MESSAGE IN RICH COMMUNICATION SERVICE (RCS) SYSTEM

CROSS-REFERENCE TO RELATED APPLICATIONS

This application is a National Phase Entry of PCT International Application No. PCT/KR2019/001890, which was filed on Feb. 15, 2019, and claims priority to Indian Provisional Patent Application No. 201841005859 filed on Feb. 15, 2018, and Indian Complete Patent Application No. 201841005859 filed on Feb. 15, 2019, in the Indian Intellectual Property Office, the content of each of which are incorporated herein by reference.

BACKGROUND

1. Field

The present disclosure relates to a rich communication service (RCS) system, and more specifically related to a method and system for handling an instant message disposition notification (IMDN) message in the RCS system.

2. Description of Related Art

There are many situations in which a message is sent and a sender later wishes to recall the message. However, a sender of the message is typically unable to review and recall a message that has already been sent. Message recall capability has been implemented in over-the-top content (OTT) environments through proprietary protocols, but this capability is typically not available in a RCS. The OTT communication services are provided by a single cloud based service provider, whereas the RCS is provided by mobile operators. The RCS fits into existing telecoms services in which mobile operators interconnect traffic. Similarly, current RCS does not support a re-fetching deleted conversation thread files from a RCS server, pausing/resuming media content in case of simultaneous file transfer, IMDN messages for poll messages, and IMDN messages for Emoticons.

Therefore, a need exists to provide solution for the above mentioned problem or other shortcomings or at least provide a useful alternative.

SUMMARY

The principal object of the embodiments herein is to provide a method and system for handling an instant message disposition notification (IMDN) message in the RCS system.

Another object of the embodiments is to update/modify unread messages in the RCS system.

Another object of the embodiments is to re-fetch deleted conversation thread files from a content server in the RCS system.

Another object of the embodiments is to pause/resume media content in case of a simultaneous file transfer in the RCS system.

Another object of the embodiments is to provide IMDN messages for poll messages in the RCS system.

Another object of the embodiments is to provide the IMDN messages for emoticons in the RCS system.

Another object of the embodiments is to provide the IMDN messages for managing forward message in the RCS system based on the emoticons.

Accordingly, the embodiments herein provide a method for handling an Instant Message Disposition Notification (IMDN) message in a rich communication service (RCS) system. The method includes receiving, by a first electronic device, a content from at least one second electronic device. Further, the method includes displaying, by the first electronic device, the content. Further, the method includes deleting, by the first electronic device, the content. Further, the method includes sending, by a first electronic device, an IMDN message to restore a content deleted by the first electronic device to at least one second electronic device. The IMDN restore message comprises an IMDN type with an original IMDN identifier of the deleted content.

In an embodiment, the method further includes receiving, by the at least one second electronic device, the IMDN message from the first electronic device. Further, the method includes determining, by the at least one second electronic device, the deleted content based on the IMDN identifier. Further, the method includes sending, by the at least one second electronic device, the deleted content to the first electronic device.

In an embodiment, sending, by the at least one second electronic device, the deleted content to the first electronic device includes determining that the deleted content is present in the at least one second electronic device based on the IMDN identifier, uploading the deleted content to a content server in response to the deleted content is present in the at least one second electronic device, sending a file information to the first electronic device; wherein the file information indicates the deleted content uploaded to the content server, wherein the file information is used to obtain the deleted content from the at least one second electronic device by the first electronic device.

In an embodiment, sending, by the at least one second electronic device, the deleted content to the first electronic device includes receiving a pause event from the first electronic device, pausing the sending of the content to the first electronic device based on the pause event, sending an IMDN message indicating that the uploading is paused to the first electronic device, receiving a resume event from the first electronic device, continuing the uploading of the content to the first electronic device based on the resume event, sending an IMDN message indicating that the uploading is resumed to the first electronic device, and sending the deleted content to the first electronic device.

In an embodiment, the method further includes receiving, by the first electronic device, the deleted content from the at least one second electronic device, and sending, by the first electronic device, a notification indicating restoration of the deleted content to the at least one second electronic device.

In an embodiment, the method further includes sending, by the first electronic device, a RCS message to the at least one second electronic device. Further, the method includes receiving, by the first electronic device, a first IMDN message, from the at least one second electronic device, indicating that the RCS message is unread at the at least one second electronic device. Further, the method includes modifying, by the first electronic device, the RCS message. Further, the method includes sending, by the first electronic device, the modified RCS message to the at least one second electronic device. Further, the method includes receiving, by the first electronic device, a second IMDN message, from the at least one second electronic device, indicating that modified RCS message delivered to the at least one second electronic device.

In an embodiment, modifying, by the first electronic device, the RCS message includes determining, by the first electronic device, an IMDN identifier and an original header associated with the RCS message, and modifying, by the first electronic device, content of the RCS message by adding a new header sequence indicating the same IMDN identifier associated with the RCS message in the modified RCS message.

In an embodiment, the method further includes uploading, by the at least one second electronic device, the content to a content sever. Further, the method includes receiving, by the at least one second electronic device, a pause event from the first electronic device. Further, the method includes pausing, by the at least one second electronic device, the uploading of the content to the content server based on the pause event. Further, the method includes sending, by the at least one second electronic device, an IMDN message indicating that the uploading is paused to the first electronic device. Further, the method includes receiving, by the at least one second electronic device, a resume event from the first electronic device. Further, the method includes continuing, by the at least one second electronic device, the uploading of the content to the content server based on the resume event. Further, the method includes sending, by the at least one second electronic device, an IMDN message indicating that the uploading is resumed to the first electronic device.

In an embodiment, the method further includes sending, by the at least one second electronic device, an IMDN message comprising at least one emoticon to the first electronic device. Further, the method includes receiving, by the first electronic device, the IMDN message including the at least one emoticon from the at least one second electronic device. Further, the method includes displaying, by the first electronic device, the IMDN message including the at least one emoticon.

In an embodiment, the method further includes sending, by the first electronic device, a poll message to the at least one second electronic device. The poll message includes a plurality of options. Further, the method includes receiving, by the first electronic device, a poll response comprising at least one option selected form the plurality of options from each of the at least one second electronic device. Further, the method includes publishing, by the first electronic device, the at least one selected option from each of the at least one second electronic device by sending an IMDN message comprising the at least one selected option to the at least one second electronic device.

In an embodiment, the at least one second electronic device sends the deleted content to the first electronic device based on settings in the at least one second electronic device.

In an embodiment, the method includes sending, by the first electronic device, the IMDN message to the at least one second electronic device. Further, the method includes receiving, by the first electronic device, a feedback corresponding to the IMDN message from the at least one second electronic device. The feedback comprises at least one of correctness information associated with the IMDN message, context associated with the IMDN message, an emotional response associated with the IMDN message and an opinion related to the IMDN message. Further, the method includes storing, by the first electronic device, the feedback. Further, the method includes performing, by the first electronic device, one of: re-sending the IMDN message to the at least one second electronic device or stopping re-sending of the IMDN message to the at least one second electronic device based on the feedback.

In an embodiment, the method includes sending, by the first electronic device, the IMDN message to the at least one second electronic device. Further, the method includes receiving, by the content server, a feedback corresponding to the IMDN message from the at least one second electronic device. The feedback comprises at least one of correctness information associated with the IMDN message, context associated with the IMDN message, an emotional response associated with the IMDN message and an opinion related to the IMDN message. Further, the method includes storing, by the content server, the feedback. Further, the method includes performing, by the content server, one of: allowing to re-send the IMDN message including the at least one emoticon to the at least one second electronic device from the first electronic device or stopping to re-send of the IMDN message including the at least one emoticon to the at least one second electronic device from the first electronic device based on the feedback.

Accordingly, the embodiments herein provide a system for handling an Instant Message Disposition Notification (IMDN) message in a rich communication service (RCS) system. The system includes a first electronic device and at least one second electronic device. The first electronic device is configured to receive a content from at least one second electronic device, display the content, and delete the content. The first electronic device is configured to send an IMDN restore message to restore a content deleted by the first electronic device to the at least one second electronic device. The IMDN restore message comprises an IMDN type with an original IMDN identifier of the deleted content. The at least one second electronic device is configured to receive the IMDN message from the first electronic device, determine the deleted content based on the IMDN identifier, and send the deleted content to the first electronic device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This method is illustrated in the accompanying drawings, throughout which like reference letters indicate corresponding parts in the various figures. The embodiments herein will be better understood from the following description with reference to the drawings, in which.

DETAILED DESCRIPTION

Figure 1:
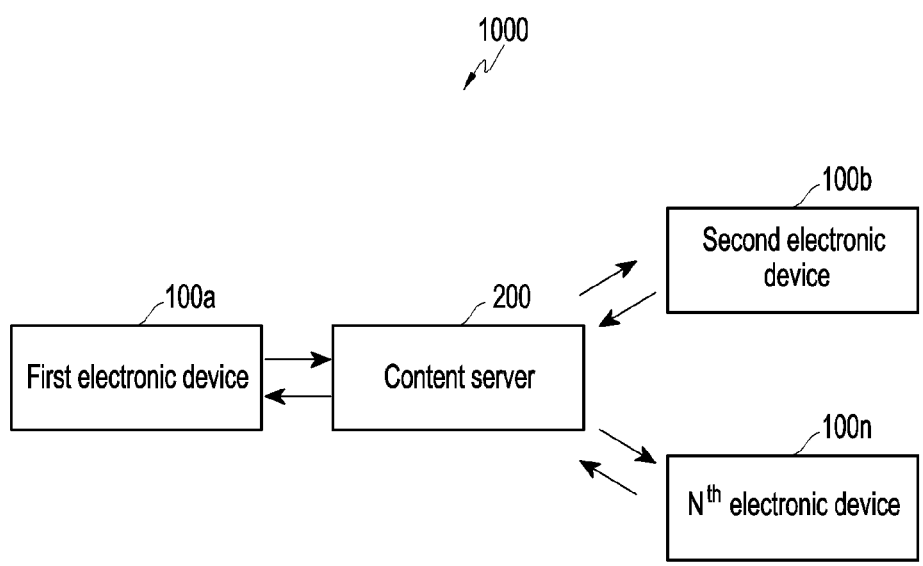
FIG. 1 is a schematic view of a system for handling an IMDN message in a RCS system, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The terms "re-fetch" and "restore" are used interchangeably in the disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Accordingly, the embodiments herein achieve a method for handling an Instant Message Disposition Notification (IMDN) message in a rich communication service (RCS) system. The method includes receiving, by a first electronic device, a content from at least one second electronic device. Further, the method includes displaying, by the first electronic device, the content. Further, the method includes deleting, by the first electronic device, the content. Further, the method includes sending, by a first electronic device, an IMDN message to restore a content deleted by the first electronic device to at least one second electronic device. The IMDN restore message comprises an IMDN type with an original IMDN identifier of the deleted content. Further, the method includes receiving, by the at least one second electronic device, the IMDN message from the first electronic device. Further, the method includes determining, by the at least one second electronic device, the deleted content based on the IMDN identifier. Further, the method includes sending, by the at least one second electronic device, the deleted content to the first electronic device.

Unlike conventional methods, the proposed method can be used to update/delete miss typed/unwanted messages in a chat conversation in an easy manner. The proposed method can be used to provide effective communication between chat threads. In the proposed methods, the deleted files can be re-fetched when required. The method can be used to provide an emoticons for each message sent/received, this results in enhancing the user experience. In the proposed methods, the IMDN extension can also be used to support to derive application use cases. The proposed method enhances the chat experience.

Referring now to the drawings, and more particularly to FIGS. 1 through 20, where similar reference characters denote corresponding features consistently throughout the figures, there are shown preferred embodiments.

FIG. 1 is a schematic view of a system 1000 for handling an IMDN message in a RCS system, according to the embodiments as disclosed herein. In an embodiment, the system 1000 includes a plurality of electronic devices 100a-100n and a content server 200. The electronic device 100a-100n can be, for example but not limited to, a cellular phone, a tablet, a smart phone, a laptop, a Personal Digital Assistant (PDA), a global positioning system, a multimedia device, a game console, a smart watch or the like. The electronic device 100a-100n may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. The content server 200 can also be an application server.

In an embodiment, the first electronic device 100a is configured to send a RCS message to the at least one second electronic device 100b-100n. Based on the RCS message, the first electronic device 100a is configured to receive a first IMDN message, from the at least one second electronic device 100b-100n, indicating that the RCS message is unread at the at least one second electronic device 100b-100n. Based on the first IMDN message, the first electronic device 100a is configured to modify the RCS message and send the modified RCS message to the at least one second electronic device 100b-100n. In an embodiment, the RCS message is modified by determining an IMDN identifier and an original header associated with the RCS message and modifying content of the RCS message by adding a new header sequence indicating the same IMDN identifier associated with the RCS message in the modified RCS message.

In an example, Common Profile for Instant Messaging (CPIM) messages can be embedded within Message Session Relay Protocol (MSRP) messages or Session Initiation Protocol (SIP) messages to exchange the messages between the first electronic device 100a and the second electronic device 100b. The proposed method can be used to add new CPIM header "Seq" to indicate the sequence number of the flow, when the same IMDN id is exchanged between the first electronic device 100a (i.e., MO side) and the second electronic device 100b (i.e., MT side). This will help to identify the IMDN response for particular sequence number. This new header, helps in case of update, delete, pause/resume IMDN messages flow between the first electronic device 100a and the second electronic device 100b.

Further, the first electronic device 100a is configured to receive a second IMDN message, from the at least one second electronic device 100b-100n, indicating that modified RCS message delivered to the at least one second electronic device 100b-100n.

In another embodiment, the first electronic device is configured to receive a content from at least one second electronic device, display the content, and delete the content. The content can be, for example, but not limited to a message, a voice message, an audio content, a video, a multimedia or the like. The content is displayed in an application (e.g., chat application, instant messaging application, a social media application or the like). After deleting the content, if the electronic device 100a wants to restore the deleted content, the first electronic device 100a is configured to send an IMDN message to restore a content deleted by the first electronic device 100a to the at least one second electronic device 100b-100n. The IMDN restore message includes an IMDN type with an original IMDN identifier of the deleted content. Further, the at least one second electronic device 100b-100n is configured to receive the IMDN message from the first electronic device 100a. Further, the at least one second electronic device 100b-100n is configured to determine the deleted content based on the IMDN identifier. Further, the at least one second electronic device 100b-100n is configured to send the deleted content to the first electronic device 100a.

In an embodiment, the at least one second electronic device 100b-100n is configured to send the deleted content to the first electronic device 100a by determining that the deleted content is present in the at least one second electronic device 100b-100n based on the IMDN identifier, uploading the deleted content to the content server 200 in response to the deleted content is present in the at least one second electronic device 100b-100n, sending a file information to the first electronic device 100a, wherein the file information indicates the deleted content uploaded to the content server 200, wherein the file information is used to obtain the deleted content from the at least one second electronic device 100b-100n by the first electronic device 100a.

In an embodiment, the at least one second electronic device 100b-100n is configured to send the deleted content to the first electronic device 100a by receiving a pause event from the first electronic device 100a, pausing the sending of the content to the first electronic device 100a based on the pause event, sending the IMDN message indicating that the uploading is paused to the first electronic device 100a, receiving the resume event from the first electronic device 100a, continuing the uploading of the content to the first electronic device 100a based on the resume event, sending an IMDN message indicating that the uploading is resumed to the first electronic device 100*a*, and sending the deleted content to the first electronic device 100*a*.

In an embodiment, the first electronic device 100*a* receives the deleted content from the at least one second electronic device 100*b*-100*n* and sends a notification indicating restoration of the deleted content to the at least one second electronic device 100*b*-100*n*. In another embodiment, the restoration of the deleted content is indicated by the original equipment manufacturer (OEM).

In an example, when the first electronic device 100*a* request for the deleted content to the second electronic device 100*b*, the second electronic device 100*b* can be notified saying that the first electronic device 100*a* is requesting the message again in the form of notification or pop-up. The notification or pop-up is displayed on a chat application of the second electronic device 100*b*. Further, the user of the second electronic device 100*b* selects the notification on the chat application, Based on the selection, the notification is navigated to an origin of the deleted content and resends the deleted content to the first electronic device 100*a* using one of a re-send button, a soft keyboard, a voice message or the like.

In an embodiment, the second electronic device 100*b* resends the deleted content to the first electronic device based on settings in the second electronic device 100*b*. In an example, if the user of the second electronic device 100*b* enables the content share facility then, the second electronic device 100*b* resends the deleted content to the first electronic device 100*a*. In an example, if the user of the second electronic device 100*b* disables the content share facility then, the second electronic device 100*b* does not resend the deleted content to the first electronic device 100*a*.

In another embodiment, the at least one second electronic device 100*b*-100*n* is configured to upload the content to a content sever 200. Further, the at least one second electronic device 100*b*-100*n* is configured to receive a pause event from the first electronic device 100*a*. Further, the at least one second electronic device 100*b*-100*n* is configured to pause the uploading of the content to the content server 200 based on the pause event. Further, the at least one second electronic device 100*b*-100*n* is configured to send the IMDN message indicating that the uploading is paused to the first electronic device 100*a* or the content server 200. Further, the at least one second electronic device 100*b*-100*n* is configured to receive a resume event from the first electronic device 100*a*. Further, the at least one second electronic device 100*b*-100*n* is configured to continue the uploading of the content to the content server 200 or the first electronic device 100*a* based on the resume event. Further, the at least one second electronic device 100*b*-100*n* is configured to send an IMDN message indicating that the uploading is resumed to the first electronic device 100*a*.

In another embodiment, the at least one second electronic device 100*b*-100*n* is configured to send the IMDN message comprising at least one emoticon to the first electronic device 100*a* and the first electronic device 100*a* is configured to receive the IMDN message including the at least one emoticon from the at least one second electronic device 100*b*-100*n*. Further, the first electronic device 100*a* is configured to display the IMDN message including the at least one emoticon.

In another embodiment, the first electronic device 100*a* is configured to send a poll message to the at least one second electronic device 100*b*-100*n*. The poll message includes a plurality of options. Further, the first electronic device 100*a* is configured to receive a poll response comprising at least one option selected form the plurality of options from each of the at least one second electronic device 100*b*-100*n*. Further, the first electronic device 100*a* is configured to publish the at least one selected option from each of the at least one second electronic device 100*b*-100*n* by sending the IMDN message comprising the at least one selected option to the at least one second electronic device 100*b*-100*n*.

Figure 2:
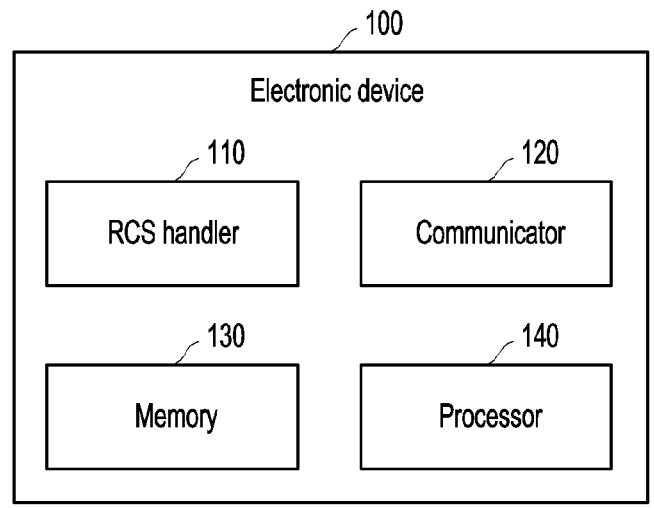
FIG. 2 is a block diagram of an electronic device, according to the embodiments as disclosed herein.

FIG. 2 is a block diagram of the electronic device 100, according to the embodiments as disclosed herein. In an embodiment, the electronic device 100 includes a RCS handler 110, a communicator 120, a memory 130 and a processor 140.

In an embodiment, the RCS handler 110 is configured to send the RCS message to the at least one second electronic device 100*b*-100*n*. Based on the RCS message, the RCS handler 110 is configured to receive the first IMDN message, from the at least one second electronic device 100*b*-100*n*, indicating that the RCS message is unread at the at least one second electronic device 100*b*-100*n*. Based on the first IMDN notification message, the RCS handler 110 is configured to modify the RCS message and send the modified RCS message to the at least one second electronic device 100*b*-100*n*. Further, the RCS handler 110 is configured to receive the second IMDN message, from the at least one second electronic device 100*b*-100*n*, indicating that modified RCS message delivered to the at least one second electronic device 100*b*-100*n*.

In another embodiment, the RCS handler 110 is configured to send the IMDN restore message to restore the message deleted by user of the first electronic device 100*a* to the at least one second electronic device 100*b*-100*n*. The IMDN restore message includes the IMDN type with the original IMDN identifier of the deleted content. Further, the RCS handler 110 is configured to receive the IMDN message from the first electronic device 100*a*. Further, the RCS handler 110 is configured to determine the deleted content based on the IMDN identifier. Further, the RCS handler 110 is configured to send the deleted content to the first electronic device 100*a*.

In another embodiment, the RCS handler 110 is configured to upload the content to the content sever 200. Further, the RCS handler 110 is configured to receive the pause event from the first electronic device 100*a*. Further, the RCS handler 110 is configured to pause the uploading of the content to the content server 200 based on the pause event. Further, the RCS handler 110 is configured to send the IMDN message indicating that the uploading is paused to the first electronic device 100*a* or the content server 200

In another embodiment, the RCS handler 110 is configured to receive the resume event from the first electronic device 100*a*. Further, RCS handler 110 is configured to continue the uploading of the content to the content server 200 or the first electronic device 100*a* based on the resume event. Further, the RCS handler 110 is configured to send the IMDN message indicating that the uploading is resumed to the first electronic device 100*a*.

In another embodiment, the at least one second electronic device 100*b*-100*n* is configured to send the IMDN message comprising at least one emoticon to the first electronic device 100*a*, and the RCS handler 110 of the first electronic device 100*a* is configured to receive the IMDN message including the at least one emoticon from the at least one second electronic device 100*b*-100*n*. Further, the RCS handler 110 is configured to display the IMDN message including the at least one emoticon.

In another embodiment, the RCS handler 110 is configured to send the poll message to the at least one second electronic device 100b-100n. The poll message includes a plurality of options. Further, the RCS handler 110 is configured to receive the poll response comprising at least one option selected form the plurality of options from each of the at least one second electronic device 100b-100n. Further, the RCS handler 110 is configured to publish the at least one selected option from each of the at least one second electronic device 100b-100n by sending the IMDN message comprising the at least one selected option to the at least one second electronic device 100b-100n.

The processor 140 is configured to execute instructions stored in the memory 130 and to perform various processes. The communicator 120 is configured for communicating internally between internal hardware components and with external devices via one or more networks.

The memory 130 stores instructions to be executed by the processor 140. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In some examples, the memory 130 can be configured to store larger amounts of information than the memory. In certain examples, a non-transitory storage medium may store data that can, over time, change (e.g., in Random Access Memory (RAM) or cache).

Although the FIG. 2 shows various hardware components of the electronic device 100 but it is to be understood that other embodiments are not limited thereon. In other embodiments, the electronic device 100 may include less or more number of components. Further, the labels or names of the components are used only for illustrative purpose and does not limit the scope of the invention. One or more components can be combined together to perform same or substantially similar function to handle the IMDN message in the RCS system.

Figure 3:
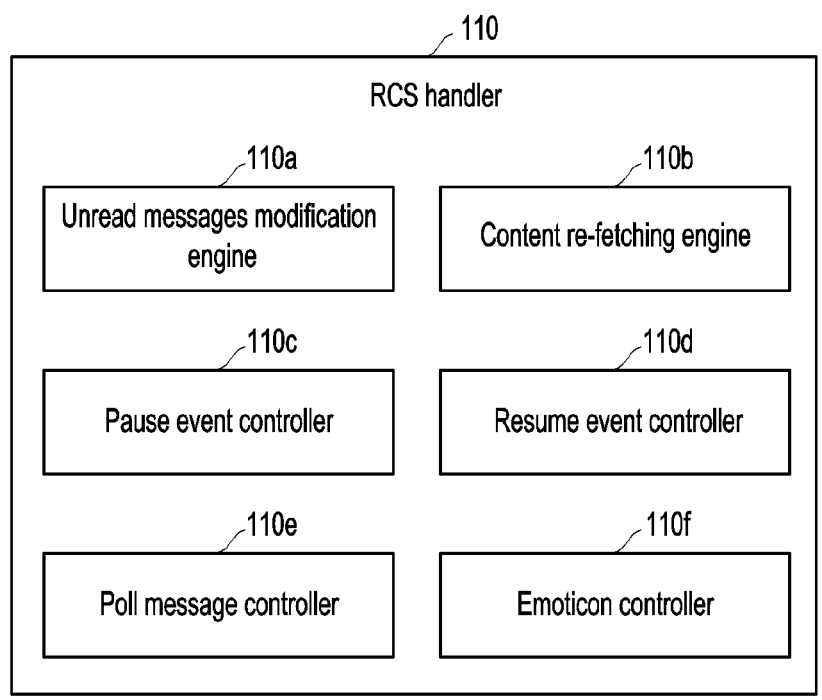
FIG. 3 is a block diagram of a RCS handler, according to the embodiments as disclosed herein.

FIG. 3 is a block diagram of the RCS handler 110, according to the embodiments as disclosed herein. In an embodiment, the RCS handler 110 includes an unread messages modification engine 110a, a content re-fetching engine 110b, a pause event controller 110c, a resume event controller 110d, a poll message controller 110e, and an emoticon controller 110f.

In an embodiment, the unread messages modification engine 110a is configured to send the RCS message to the at least one second electronic device 100b-100n. Based on the RCS message, the unread messages modification engine 110a is configured to receive the first IMDN message, from the at least one second electronic device 100b-100n, indicating that the RCS message is unread at the at least one second electronic device 100b-100n. Based on the first IMDN message, the unread messages modification engine 110a is configured to modify the RCS message and send the modified RCS message to the at least one second electronic device 100b-100n. Further, the unread messages modification engine 110a is configured to receive the second IMDN message, from the at least one second electronic device 100b-100n, indicating that modified RCS message delivered to the at least one second electronic device 100b-100n.

In another embodiment, the content re-fetching engine 110b is configured to send the IMDN message to restore the message deleted by user of the first electronic device 100a to the at least one second electronic device 100b-100n. The IMDN restore message includes the IMDN notification type with the original IMDN identifier of the deleted content. Further, the content re-fetching engine 110b is configured to receive the IMDN message from the first electronic device 100a. Further, the content re-fetching engine 110b is configured to determine the deleted content based on the IMDN identifier. Further, the content re-fetching engine 110b is configured to send the deleted content to the first electronic device 100a.

In an embodiment, the content re-fetching engine 110b is configured to send the deleted content to the first electronic device 100a by determining that the deleted content is present in the at least one second electronic device 100b-100n based on the IMDN identifier, uploading the deleted content to the content server 200 in response to the deleted content is present in the at least one second electronic device 100b-100n, sending a file information to the first electronic device 100a, wherein the file information indicates the deleted content uploaded to the content server 200, wherein the file information is used to obtain the deleted content from the at least one second electronic device 100b-100n by the first electronic device 100a.

In an embodiment, the content re-fetching engine 110b is configured to send the deleted content to the first electronic device 100a by receiving a pause event from the first electronic device 100a, pausing the sending of the content to the first electronic device 100a based on the pause event, sending the IMDN message indicating that the uploading is paused to the first electronic device 100a, receiving the resume event from the first electronic device 100a, continuing the uploading of the content to the first electronic device 100a based on the resume event, sending an IMDN message indicating that the uploading is resumed to the first electronic device 100a, and sending the deleted content to the first electronic device 100a.

In an embodiment, the content re-fetching engine 110b receives the deleted content from the at least one second electronic device 100b-100n and sends a notification indicating restoration of the deleted message to the at least one second electronic device 100b-100n.

In another embodiment, the pause event controller 110c is configured to upload the content to the content sever 200. Further, the pause event controller 110c is configured to receive the pause event from the first electronic device 100a. Further, the pause event controller 110c is configured to pause the uploading of the content to the content server 200 based on the pause event. Further, the pause event controller 110c is configured to send the IMDN message indicating that the uploading is paused to the first electronic device 100a or the content server 200

In another embodiment, the resume event controller 110d is configured to receive the resume event from the first electronic device 100a. Further, resume event controller 110d is configured to continue the uploading of the content to the content server 200 or the first electronic device 100a based on the resume event. Further, the resume event controller 110d is configured to send the IMDN message indicating that the uploading is resumed to the first electronic device 100a.

In another embodiment, the at least one second electronic device 100b-100n is configured to send the IMDN message comprising at least one emoticon to the first electronic device 100a, and the emoticon controller 110f of the first electronic device 100a is configured to receive the IMDN message including the at least one emoticon from the at least one second electronic device 100b-100n. Further, the emoticon controller 110f is configured to display the IMDN message including the at least one emoticon.

In another embodiment, the poll message controller 110e is configured to send the poll message to the at least one second electronic device 100b-100n. The poll message includes a plurality of options. Further, the poll message controller 110e is configured to receive the poll response comprising at least one option selected form the plurality of options from each of the at least one second electronic device 100b-100n. Further, the poll message controller 110e is configured to publish the at least one selected option from each of the at least one second electronic device 100b-100n by sending the IMDN message comprising the at least one selected option to the at least one second electronic device 100b-100n.

Although the FIG. 3 shows various hardware components of the RCS handler 110 but it is to be understood that other embodiments are not limited thereon. In other embodiments, the RCS handler 110 may include less or more number of components. Further, the labels or names of the components are used only for illustrative purpose and does not limit the scope of the invention. One or more components can be combined together to perform same or substantially similar function to handle the IMDN message in the RCS system.

Figure 4:
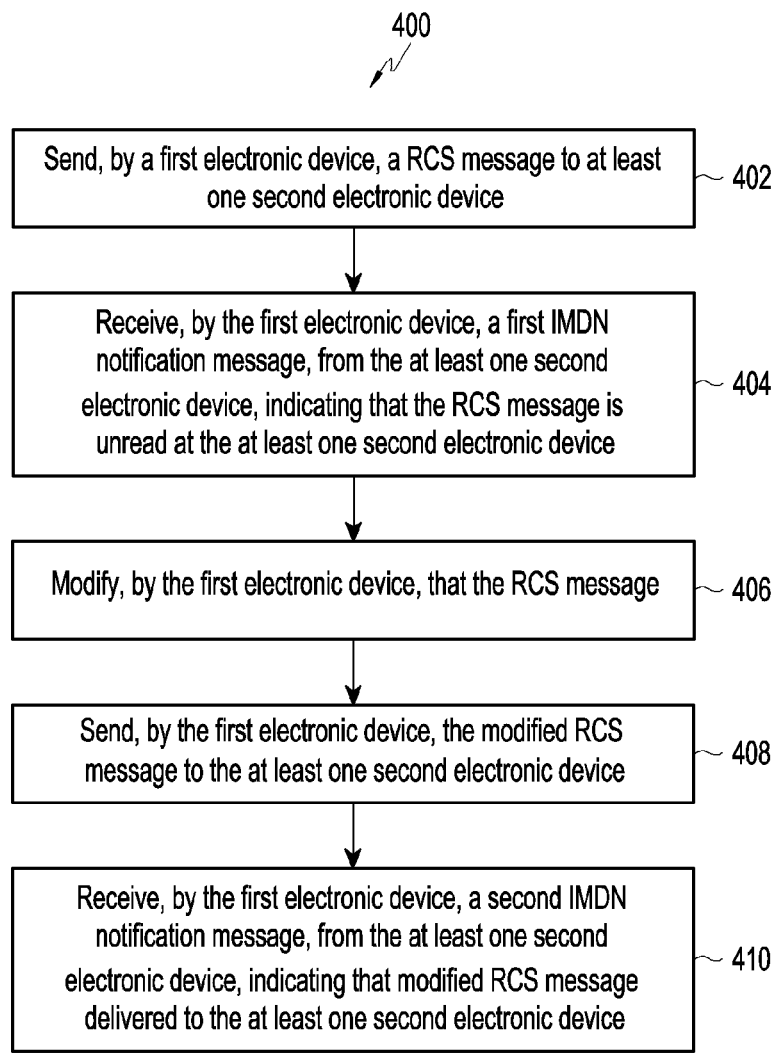
FIG. 4 is a flow diagram illustrating various operations for handling an IMDN message in the RCS system, while updating/modifying unread messages in the RCS system, according to the embodiments as disclosed herein.

FIG. 4 is a flow diagram 400 illustrating various operations for handling the IMDN message in the RCS system, while updating/modifying the unread messages in the RCS system, according to the embodiments as disclosed herein. The operations (402-410) are performed by the unread messages modification engine 110a.

At 402, the method includes sending, by the first electronic device 100a, the RCS message to at least one second electronic device 100b-100n. At 404, the method includes receiving, by the first electronic device 100a, the first IMDN message, from the at least one second electronic device 100b-100n, indicating that the RCS message is unread at the at least one second electronic device 100b-100n. At 406, the method includes modifying, by the first electronic device 100a, the RCS message. At 408, the method includes sending, by the first electronic device 100a, the modified RCS message to the at least one second electronic device 100b-100n. At 410, the method includes receiving, by the first electronic device 100a, a second IMDN message, from the at least one second electronic device 100b-100n, indicating that modified RCS message delivered to the at least one second electronic device 100b-100n.

The various actions, acts, blocks, steps, or the like in the flow diagram 400 may be performed in the order presented, in a different order or simultaneously. Further, in some embodiments, some of the actions, acts, blocks, steps, or the like may be omitted, added, modified, skipped, or the like without departing from the scope of the invention.

Figure 5:
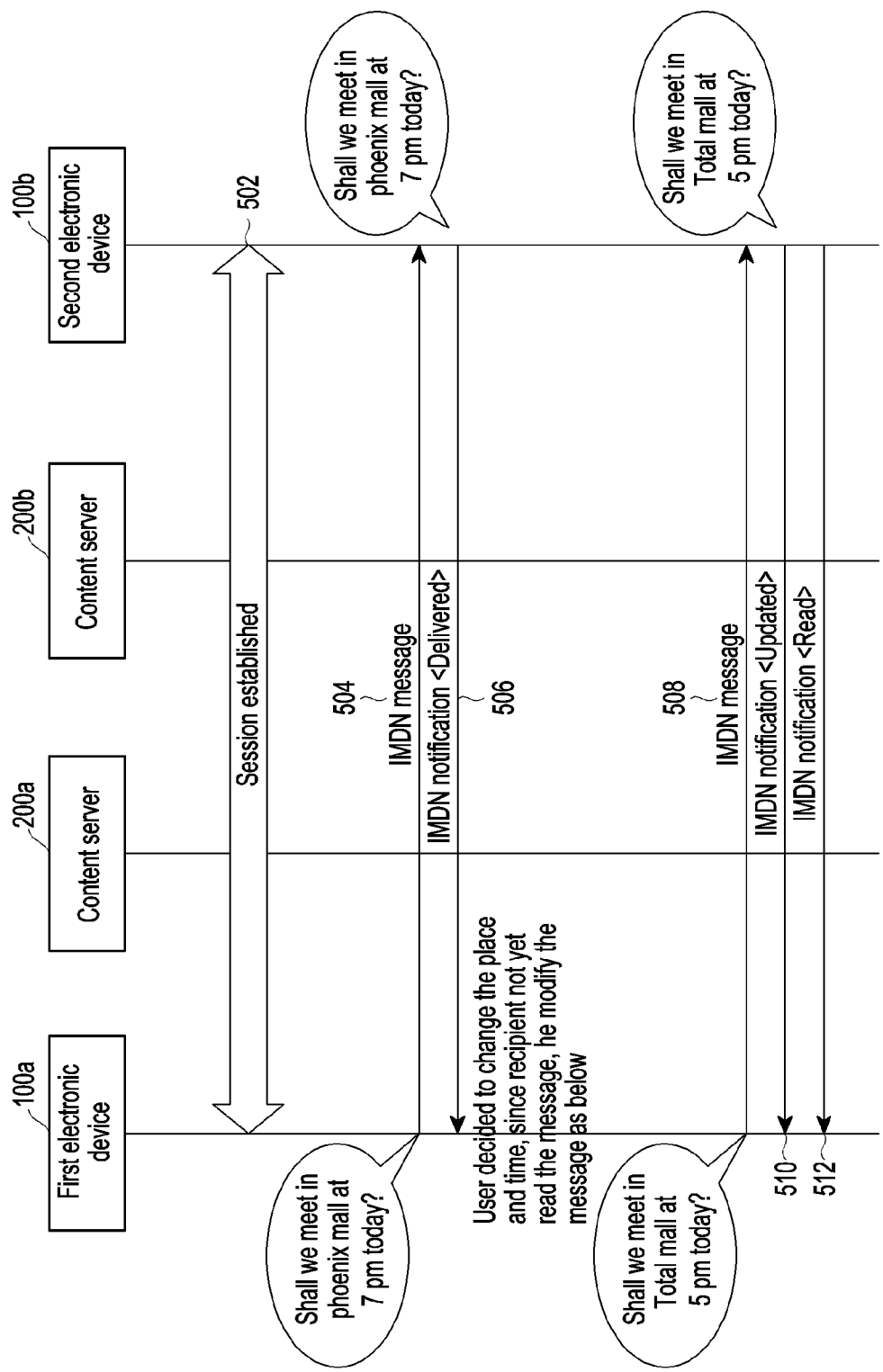
FIG. 5 is a sequential diagram illustrating operations involved in updating/modifying the unread messages in the RCS system, according to the embodiments as disclosed herein.

FIG. 5 is a sequential diagram illustrating operations involved in updating/modifying the unread messages in the RCS system, according to the embodiments as disclosed herein. At 502, the first electronic device 100a establishes a communication session with the second electronic device 100b. At 504, the first electronic device 100a sends the message as "shall we meet in the phoenix mall at 7 pm today?" to the second electronic device 100b. At 506, the first electronic device 100a receives a delivery confirmation from the second electronic device 100b. Consider, the user of the first electronic device 100a decided to change the place and time, since recipient not yet read the message, the user of the electronic device 100 modifies the message as "Shall we meet in Total mall at 5 pm today?" and sends to the second electronic device 100b at 508. At 510, the first electronic device 100a receives the IMDN message including an update information from the second electronic device 100b. At 512, the first electronic device 100a receives the IMDN message including a read information from the second electronic device 100b.

Figure 6A:
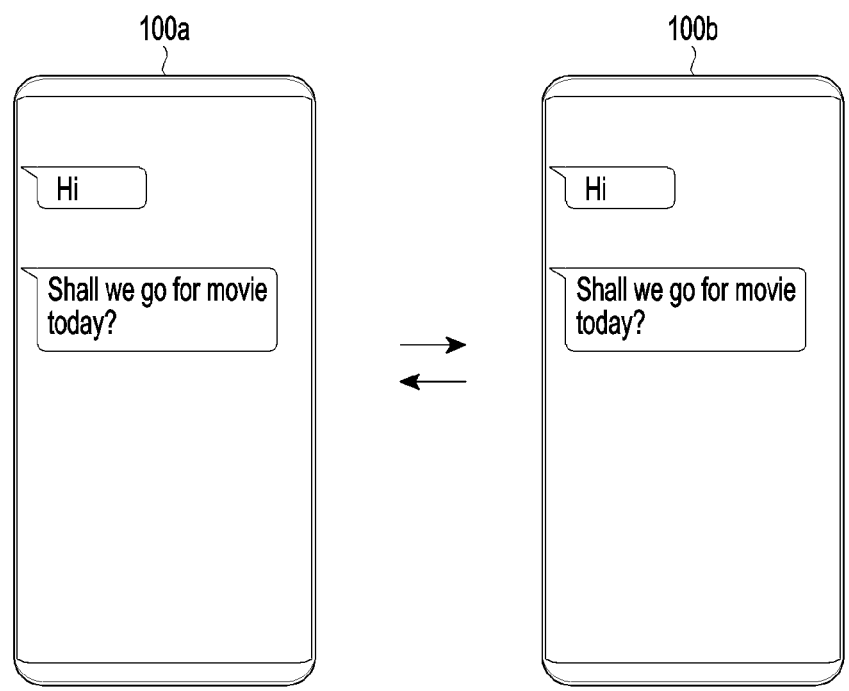
FIG. 6*a* and FIG. 6*b* illustrate example scenarios of updating/modifying unread messages in the RCS system, according to the embodiments as disclosed herein.
Figure 6B:
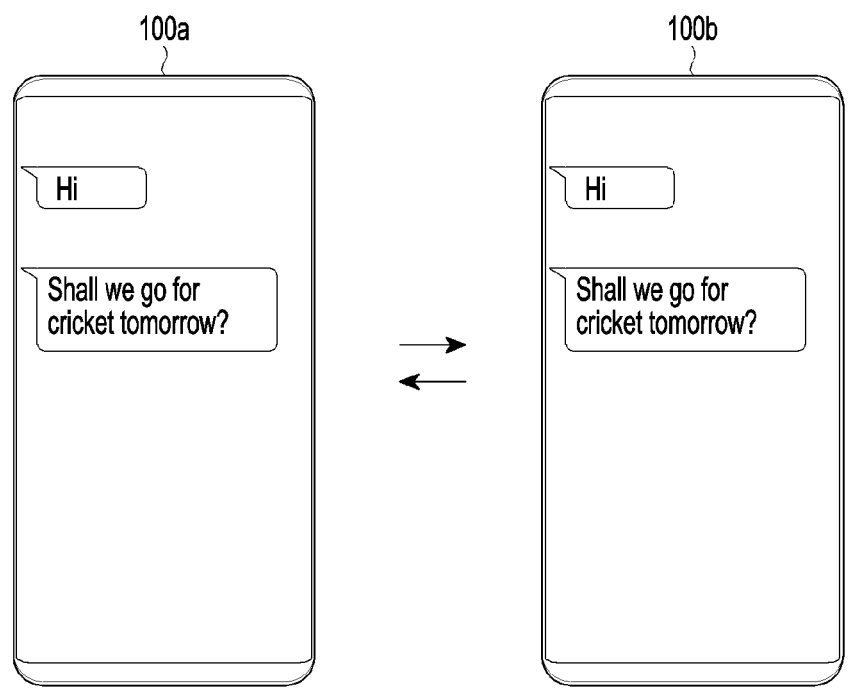

FIG. 6a and FIG. 6b illustrate example scenarios of updating/modifying unread messages in the RCS system, according to the embodiments as disclosed herein. More often the user of types some content on the first electronic device 100a and sends the content to the second electronic device 100b. Later, the user of the first electronic device realizes that the content sent is not proper and message need to be modified. Based on the proposed method, the user can update/modify the content, at the first electronic device 100a. Further, the modified content will be reflected and the user would be notified with the update status. In an example, the first electronic device 100a sends the message as "shall we go for movie today?" to the second electronic device 100b as shown in the FIG. 6a. The first electronic device 100a receives a delivery confirmation from the second electronic device 100b. Consider, the user of the first electronic device 100a decided to change the place and time, since recipient not yet read the message, the user of the electronic device 100 modifies the message as "Shall we go for cricket tomorrow?" and sends to the second electronic device 100b as shown in the FIG. 6b. The first electronic device 100a receives the IMDN message including the update information from the second electronic device 100b. The first electronic device 100a receives the IMDN message including the read information from the second electronic device 100b.

Figure 7:
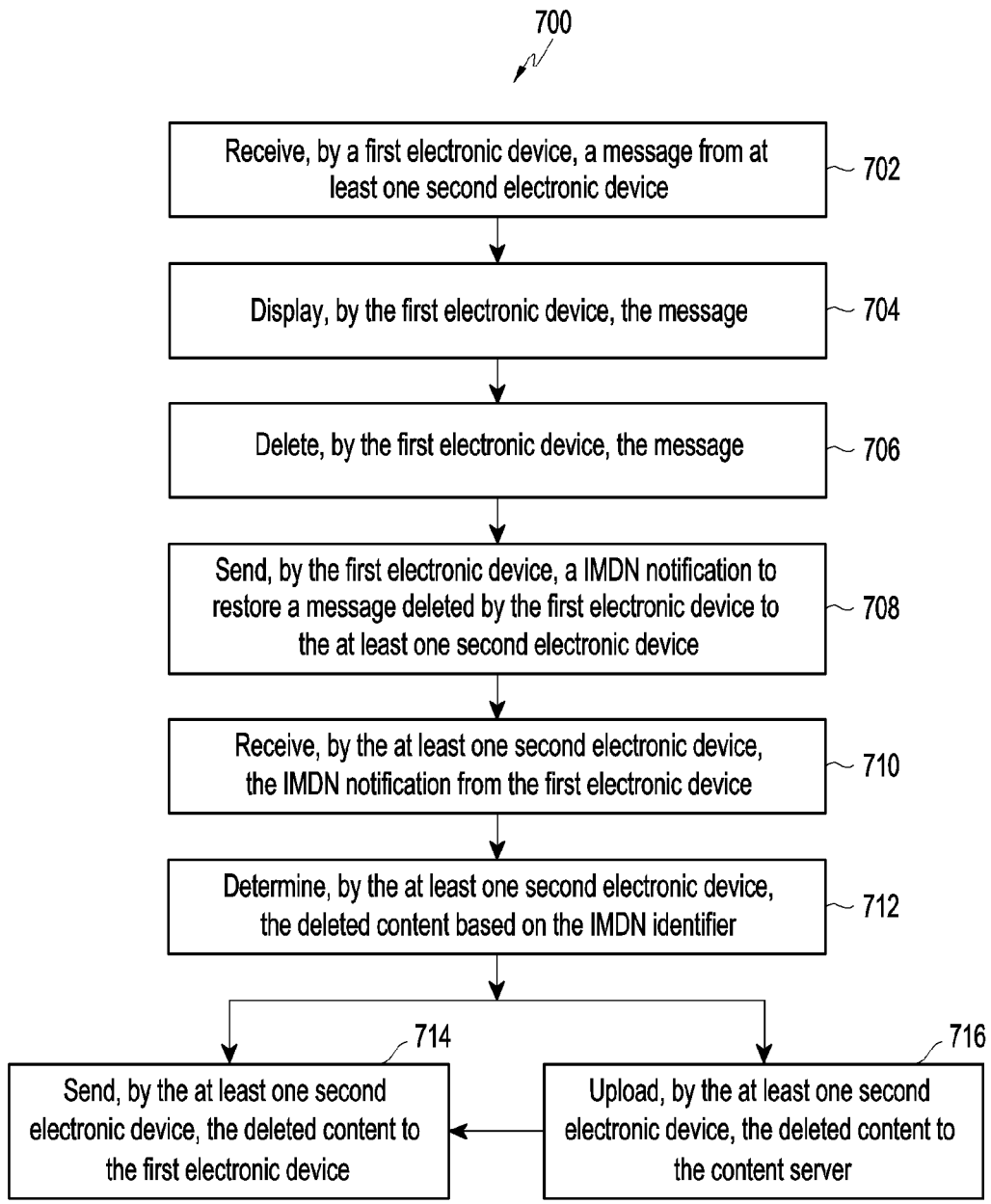
FIG. 7 is a flow diagram illustrating various operations for handling the IMDN message in the RCS system, while re-fetching deleted conversation thread files in the RCS system, according to the embodiments as disclosed herein.

FIG. 7 is a flow diagram 700 illustrating various operations for handling the IMDN message in the RCS system, while re-fetching the deleted conversation thread files in the RCS system, according to the embodiments as disclosed herein. The operations (702-716) are performed by the content re-fetching engine 110b.

At 702, the method includes receiving, by the first electronic device 100a, a message from at least one second electronic device 100b-100n. At 704, the method includes displaying, by the first electronic device 100a, the message. At 706, the method includes deleting, by the first electronic device 100a, the message. At 708, the method includes sending, by the first electronic device 100a, the IMDN restore message to restore the message deleted by the first electronic device 100a to the at least one second electronic device 100b-100n. The IMDN restore message includes the IMDN type with the original IMDN identifier of the deleted content. At 710, the method includes receiving, by the at least one second electronic device 100b-100n, the IMDN message from the first electronic device 100a. At 712, the method includes determining, by the at least one second electronic device 100b-100n, the deleted content based on the IMDN identifier. At 714, the method includes sending, by the at least one second electronic device 100b-100n, the deleted content to the first electronic device 100a. At 716, the method includes uploading, by the at least one second electronic device 100b-100n, the deleted content to the content server 200. Further, the first electronic device 100a receives the deleted content from the content server 200.

The various actions, acts, blocks, steps, or the like in the flow diagram 700 may be performed in the order presented, in a different order or simultaneously. Further, in some embodiments, some of the actions, acts, blocks, steps, or the like may be omitted, added, modified, skipped, or the like without departing from the scope of the invention.

Figure 8:
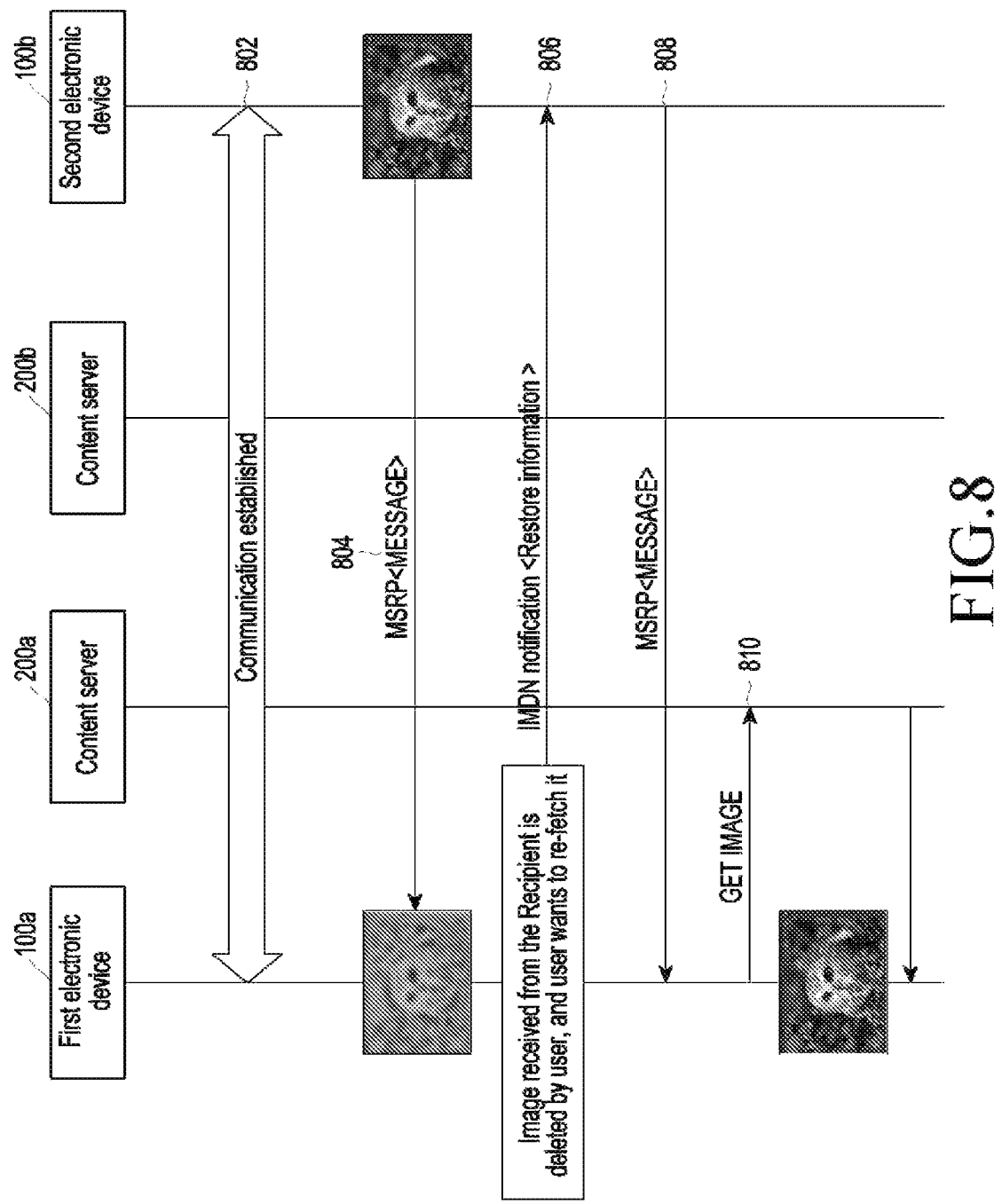
FIG. 8 is a sequential diagram illustrating various operations involved in re-fetching the deleted conversation thread files from the RCS system, according to the embodiments as disclosed herein.

FIG. 8 is a sequential diagram illustrating various operations involved in re-fetching the deleted conversation thread files from the RCS system, according to the embodiments as disclosed herein.

At 802, the communication session is established between the first electronic device 100*a* and the second electronic device 100*b*. The second electronic device 100*b* sends the MSRP MESSAGE to the first electronic device 100*a*. The image received from the recipient is deleted by the user of the first electronic device and the user of the first electronic device 100*a* wants to re-fetch the image. At 806, the first electronic device 100*a* sends the IMDN message includes restore information to the second electronic device 100*b*. At 808, the second electronic device 100*b* sends the MSRP MESSAGE to the first electronic device 100*a*. Based on the MSRP MESSAGE, the first electronic device 100*a* obtains the image from the server at 810.

Figure 9A:
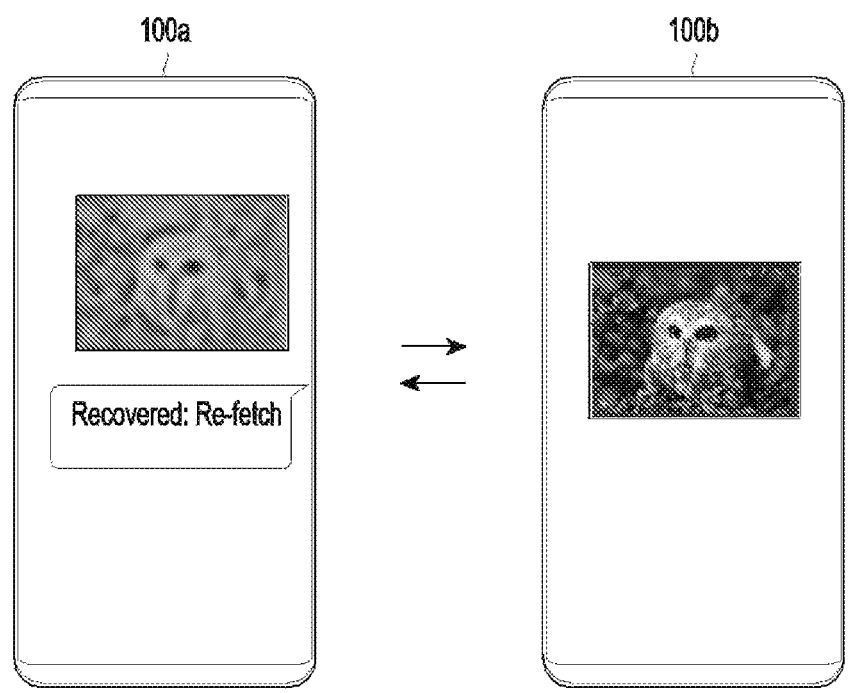
FIG. 9*a* and FIG. 9*b* illustrate example scenarios of re-fetching deleted conversation thread files from a content server, according to the embodiments as disclosed herein.
Figure 9B:
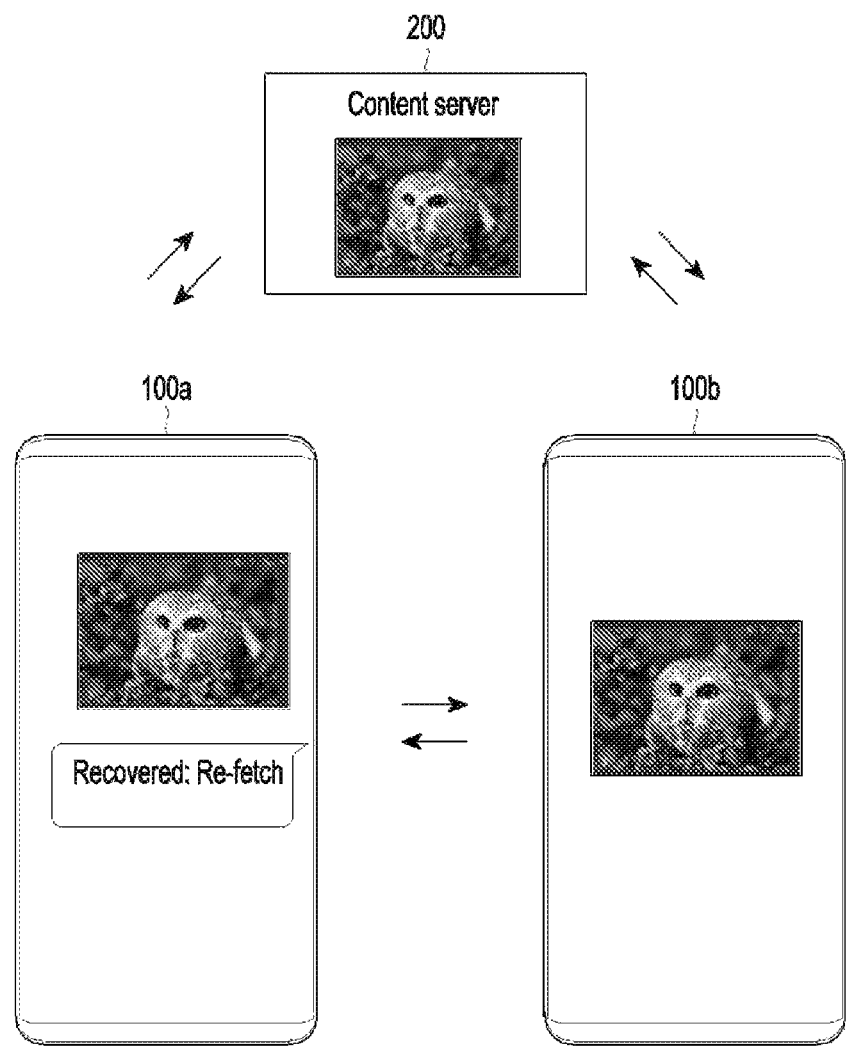

FIG. 9*a* and FIG. 9*b* illustrate example scenarios of re-fetching deleted conversation thread files from the content server 200, according to the embodiments as disclosed herein. It often happens that, the user of the first electronic device 100*a* may delete many video/image/audio/text messages from their phone. Later, the user may want to recollect the message for various reasons (e.g., user may want to show/forward messages to our friends).

As shown in the FIG. 9*a* and FIG. 9*b*, in order to restore the image, the deleted message side, a new IMDN type<restore> is triggered with the original IMDN id of the deleted message. On the second electronic device 100, upon receiving the IMDN message with <restore>, the second electronic device 100*b* will search for the IMDN id, and if it is a message, the message would be sent again to the first electronic device 100*a*. If it is a file, the file will be uploaded again to the content server 200 and share the file link in a MSRP message to the first electronic device 100*a*. The first electronic device 100*a* downloads the file link from the content server 200 and displayed to the user.

Figure 10:
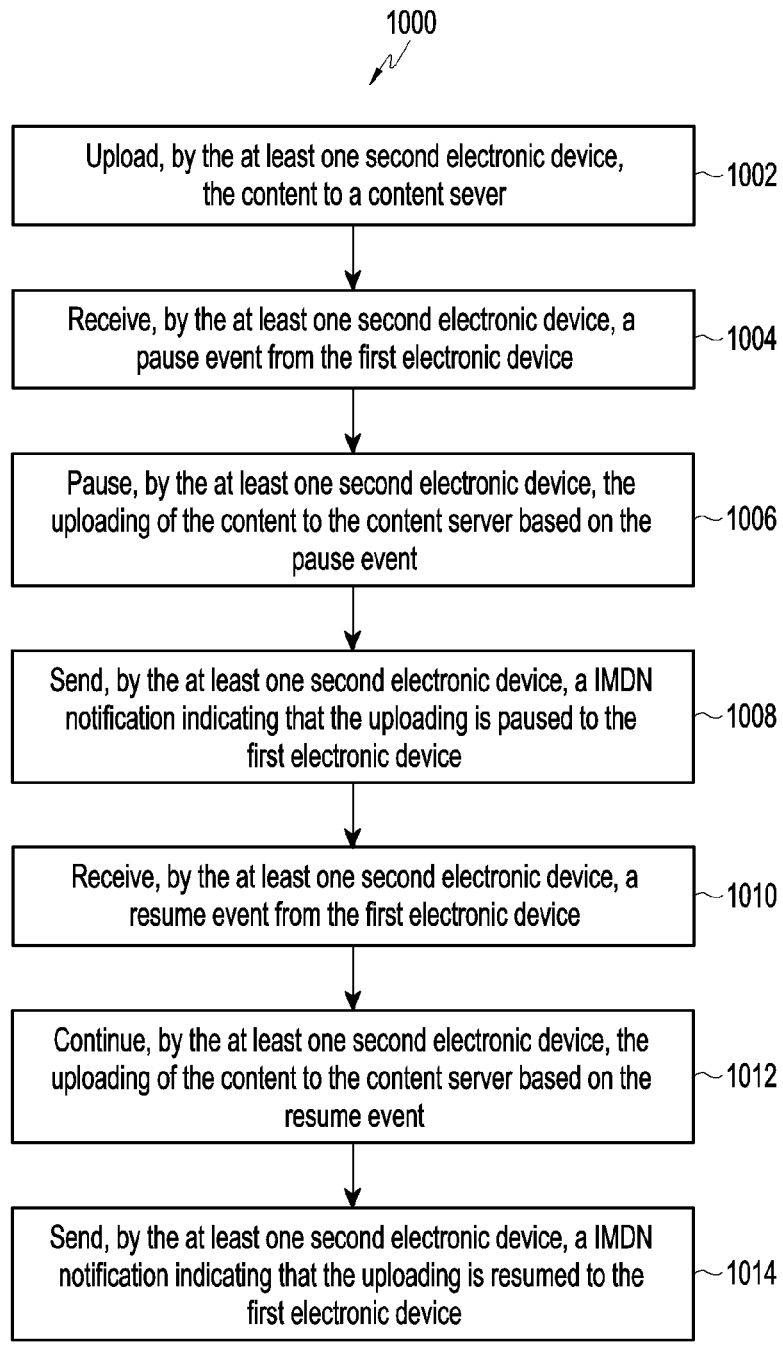
FIG. 10 is a flow diagram illustrating various operations for handling the IMDN message in the RCS system, while pausing/resuming the media content in case of simultaneous file transfer in the RCS system, according to the embodiments as disclosed herein.

FIG. 10 is a flow diagram 1000 illustrating various operations for handling the IMDN message in the RCS system, while pausing/resuming the media content in case of simultaneous file transfer in the RCS system, according to the embodiments as disclosed herein. The operations (1002-1008) are performed by the pause event controller 110*c*. The operations (1010-1014) are performed by the resume event controller 110*d*.

At 1002, the method includes uploading, by the at least one second electronic device 100*b*-100*n*, the content to the content sever 200. At 1004, the method includes receiving, by the at least one second electronic device 100*b*-100*n*, the pause event from the first electronic device 100*a*. At 1006, the method includes pausing, by the at least one second electronic device 100*b*-100*n*, the uploading of the content to the content server 200 based on the pause event. At 1008, the method includes sending, by the at least one second electronic device 100*b*-100*n*, the IMDN notification indicating that the uploading is paused to the first electronic device 100*a*. At 1010, the method includes receiving, by the at least one second electronic device 100*b*-100*n*, the resume event from the first electronic device 100*a*. At 1012, the method includes continuing, by the at least one second electronic device 1100*b*-100*n*, the uploading of the content to the content server 200 based on the resume event. At 1014, the method includes sending, by the at least one second electronic device 100*b*-100*n*, an IMDN message indicating that the uploading is resumed to the first electronic device 100*a*.

The various actions, acts, blocks, steps, or the like in the flow diagram 1000 may be performed in the order presented, in a different order or simultaneously. Further, in some embodiments, some of the actions, acts, blocks, steps, or the like may be omitted, added, modified, skipped, or the like without departing from the scope of the invention.

Figure 11:
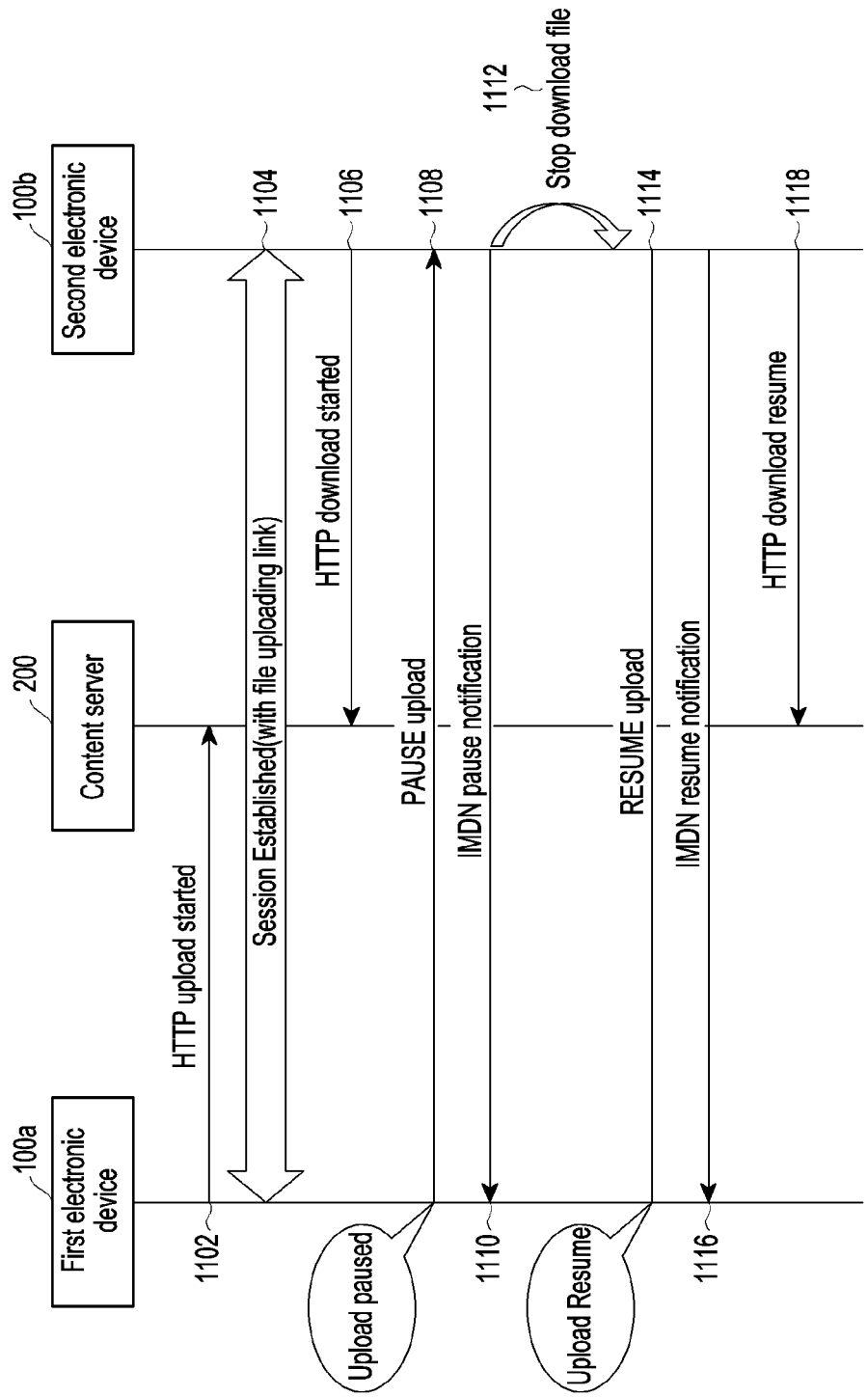
FIG. 11 is a sequential diagram illustrating various operations involved in pausing/resuming the media content in case of the simultaneous file transfer, according to the embodiments as disclosed herein.

FIG. 11 is a sequential diagram illustrating various operations involved in pausing/resuming the media content in case of the simultaneous file transfer, according to the embodiments as disclosed herein.

At 1102, the user of the first electronic device 100*a* initiates the HTTP upload operation with the content server 200. At 1104, the session is established, with file uploading link, between the first electronic device 100*a* and the second electronic device 100*b*. At 1106, the HTTP download operations is started at the second electronic device 100*b*. The first electronic device 100*a* sends the pause upload message to the second electronic device 100*b*. At 1110, the second electronic device 100*b* sends the IMDN pause notification to the first electronic device. At 1114, the first electronic device sends the resume upload message to the second electronic device. At 1116, the second electronic device 100*b* sends the IMDN resume notification to the first electronic device 100*a*. Based on the IMDN resume notification, the second electronic device 100*b* sends the HTTP download resume message to the server 200 at 1118.

Figure 12:
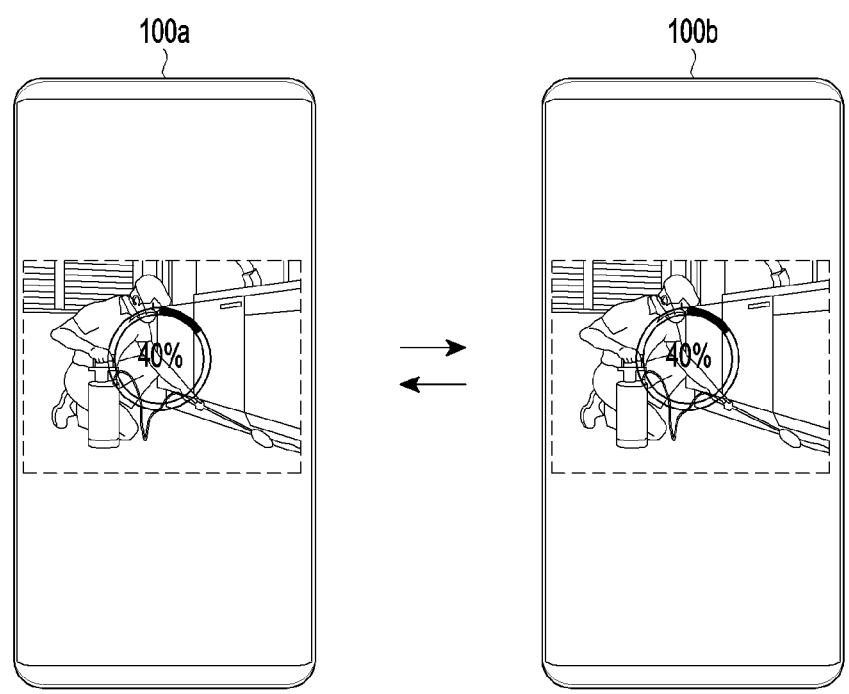
FIG. 12 illustrates an example scenario of pausing/resuming the media content in case of a simultaneous file transfer, according to the embodiments as disclosed herein.

FIG. 12 illustrates an example scenario of pausing/resuming the media content in case of a simultaneous file transfer, according to the embodiments as disclosed herein. The proposed method can be used to optimize the upload and download the content through file transfer over HTTP. The file resume/pause scenarios can also be handled in a session by adding pause and resume IMDN messages. When the user at the first electronic device 100*a* pauses the transfer in case of simultaneous upload/download, the first electronic device 100*a* (i.e., MO device) informs the second electronic device 100*b* (e.g., MT) about the "pause" status, so that second electronic device 100*b* doesn't try. In this way pause/resume/cancel events can be handled between the devices reliably using the IMDN messages.

Figure 13:
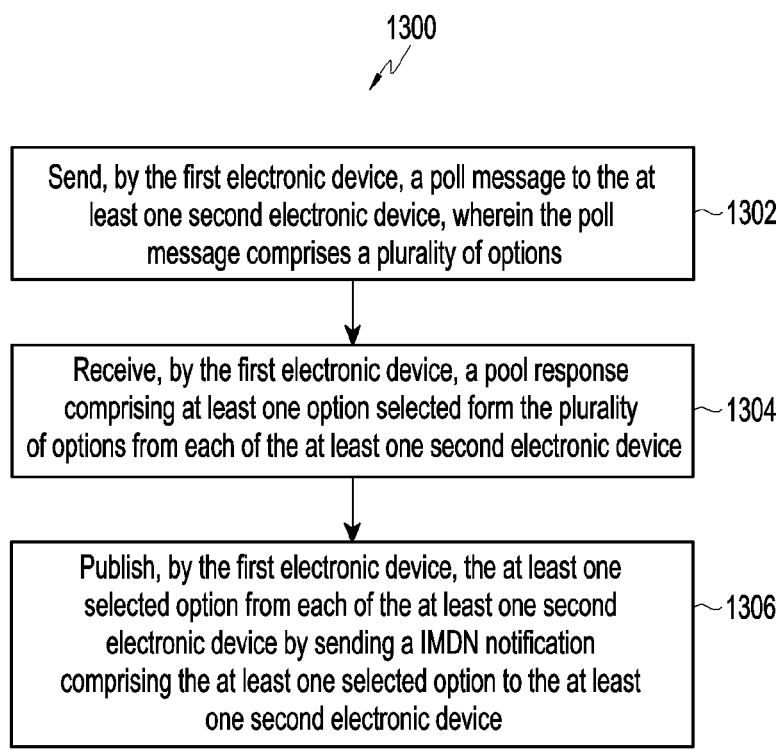
FIG. 13 is a flow diagram illustrating various operations for handling the IMDN message in the RCS system, while managing the IMDN messages for poll messages in the RCS system, according to the embodiments as disclosed herein.

FIG. 13 is a flow diagram 1300 illustrating various operations for handling the IMDN message in the RCS system, while managing the IMDN messages for poll messages in the RCS system, according to the embodiments as disclosed herein. The operations (1302-1306) are performed by the poll message controller 110*e*.

At 1302, the method includes sending, by the first electronic device 100*a*, the poll message to the at least one second electronic device 100*b*-100*n*, wherein the poll message includes a plurality of options. At 1304, the method includes receiving, by the first electronic device 100*a*, the poll response comprising at least one option selected form the plurality of options from each of the at least one second electronic device 100*b*-100*n*. At 1306, the method includes publishing, by the first electronic device 100*a*, the at least one selected option from each of the at least one second electronic device by sending the IMDN message comprising the at least one selected option to the at least one second electronic device 100*b*-100*n*.

The various actions, acts, blocks, steps, or the like in the flow diagram 1300 may be performed in the order presented, in a different order or simultaneously. Further, in some embodiments, some of the actions, acts, blocks, steps, or the like may be omitted, added, modified, skipped, or the like without departing from the scope of the invention.

Figure 14:
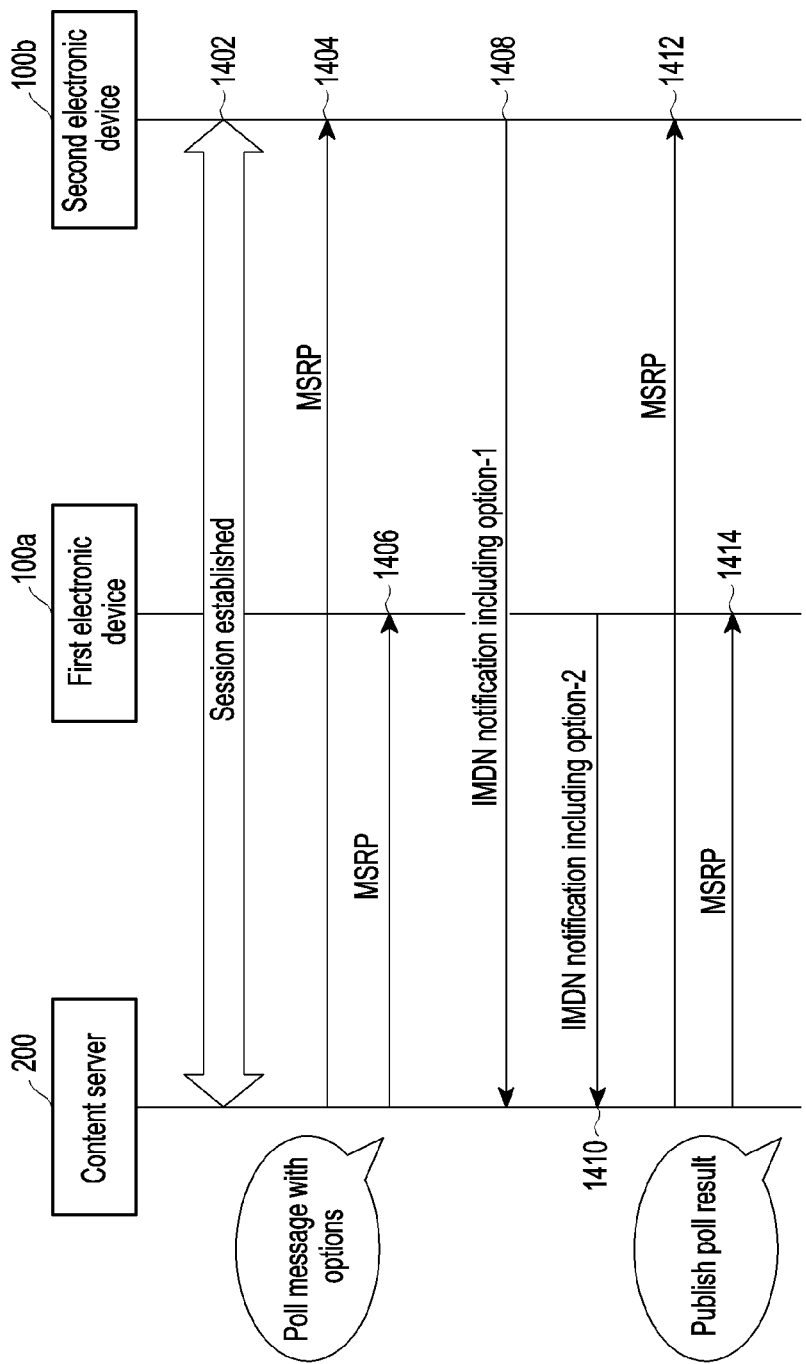
FIG. 14 and FIG. 15 are sequential diagrams illustrating various operations involved in providing IMDN messages for the poll messages, according to the embodiments as disclosed herein.
Figure 15:
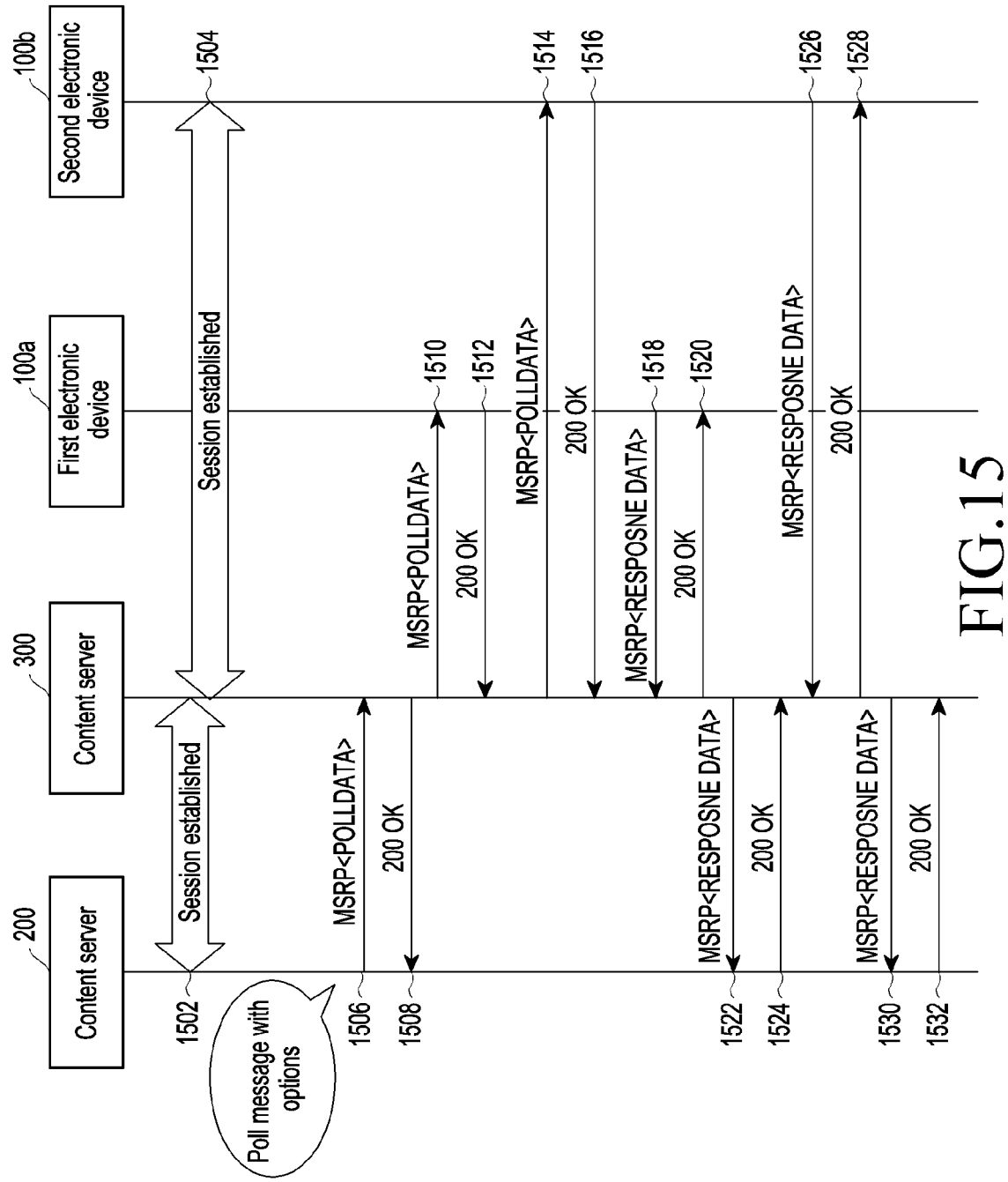

FIG. 14 and FIG. 15 are sequential diagrams illustrating various operations involved in providing IMDN messages for the poll messages, according to the embodiments as disclosed herein.

As shown in the FIG. 14, at 1402, the session established is established amount the first electronic device 100*a*, the second electronic device 100*b* and the server 200. At 1404 and At 1406, the server 200 sends MSRP message to the second electronic device 100*b* and the first electronic device 100*a*, respectively. At 1408, the second electronic device 100*b* sends the IMDN message including option-1 to the server 200. At 1410, the first electronic device 100*a* sends the IMDN message including option-2 to the server 200. At 1412 and At 1414, the server 200 sends MSRP to the second electronic device 100*b* and the first electronic device 100*a*, respectively.

In an example, the poll messages lets the user to write a question and some possible answers, send them to everyone in a group chat, and then see what is most popular. So the user can make plans together. To achieve this functionality in IMS, the IMDN messages should extend to support poll messages. DUT will send the poll message to group chat participants, with all the possible options associated with the poll message. When the participants, select any options, it would be notified to the DUT using the IMDN message to DUT. Further, the DUT would publish the data to all the participants.

In an example, the poll messages data and the response can also be achieved through the MSRP protocol by carrying the request and responses in a JSON data object. For Chabot (Application to person case (A2P)), there is already a similar JSON object to carry the bot data from the chat bot to the Device using the content type "application/vnd.gsma.bot-suggestion.v1.0+json". Similar JSON format can be used for the P2P use cases. For example if the DUT wants to the send poll message to participants, it can send the poll message data and the associated options are embedded within the JSON object and send as a MSRP body to the poll participants. JSON content type for the poll messages and responses can be defined as application/vnd.gsma.pollmessage.json and application/vnd.gsma.pollResponse.v1.0+json.

In an example, the JSON format will be added to send the poll message data and the JSON format will be having information on each OPTIONS associated with the poll message, to be provided to the poll message participants. These OPTIONS can be made enriched by giving the options to upload the images, & other value added services (likes if a poll message is to choose the resort, then each resorts image, name, ratings etc., are provided). In the JSON, this JSON would be sent as a MSRP message body. Based on the content type, participant devices will interpret it as a poll message, and show the OPTIONS with the enriched data provided in the JSON.

As shown in the FIG. 15, at 1502, the communication session is established between the content server 200 and the conference server 300. At 1504, the communication session is established among the first electronic device 100*a*, the second electronic device 100*b* and the conference server 300. At 1506, the content server sends the MSRP message including the POLLDATA to the conference server 300. Based on the MSRP message, at 1508, the conference server 300 sends the 200 OK message to the content server 200.

At 1510, the conference server 300 sends the MSRP message including the POLLDATA to the first electronic device 100*a*. Based on the MSRP message, at 1512, the first electronic device 100*a* sends the 200 OK message to the conference server 300.

At 1514, the conference server 300 sends the MSRP message including the POLLDATA to the second electronic device 100*b*. Based on the MSRP message, at 1516, the second electronic device 100*b* sends the 200 OK message to the conference server 300.

At 1518, the first electronic device 100*a* sends the MSRP message including the response data to the conference server 300. At 1520, the conference server 300 sends the OK message to the first electronic device 100*a*. At 1522, the conference server 300 sends the MSRP message including the response data to the content server 200. At 1524, the content server 200 sends the OK message to the conference server 300.

At 1526, the second electronic device 100*b* sends the MSRP message including the response data to the conference server 300. At 1528, the conference server 300 sends the OK message to the second electronic device 100*b*. At 1530, the conference server 300 sends the MSRP message including the response data to the content server 200. At 1532, the content server 200 sends the OK message to the conference server 300.

Figure 16:
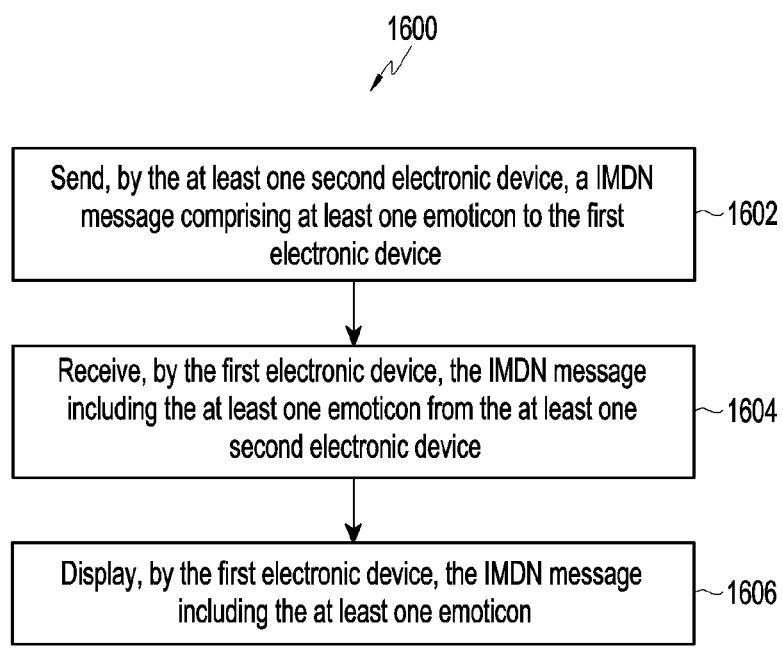
FIG. 16 is a flow diagram illustrating various operations for handling the IMDN message in the RCS system, while managing the IMDN messages for the Emoticons in the RCS system, according to the embodiments as disclosed herein.

FIG. 16 is a flow diagram 1600 illustrating various operations for handling the IMDN message in the RCS system, while managing the IMDN messages for the emoticons in the RCS system, according to the embodiments as disclosed herein. The operations (1602-1606) are performed by the emoticon controller 110*f*.

At 1602, the method includes sending, by the at least one second electronic device 100*b*-100*n*, the IMDN message including at least one emoticon to the first electronic device 100*a*. At 1604, the method includes receiving, by the first electronic device 100*a*, the IMDN message including the at least one emoticon from the at least one second electronic device. At 1606, the method includes displaying, by the first electronic device, the IMDN message including the at least one emoticon.

The various actions, acts, blocks, steps, or the like in the flow diagram 1600 may be performed in the order presented, in a different order or simultaneously. Further, in some embodiments, some of the actions, acts, blocks, steps, or the like may be omitted, added, modified, skipped, or the like without departing from the scope of the invention.

Figure 17:
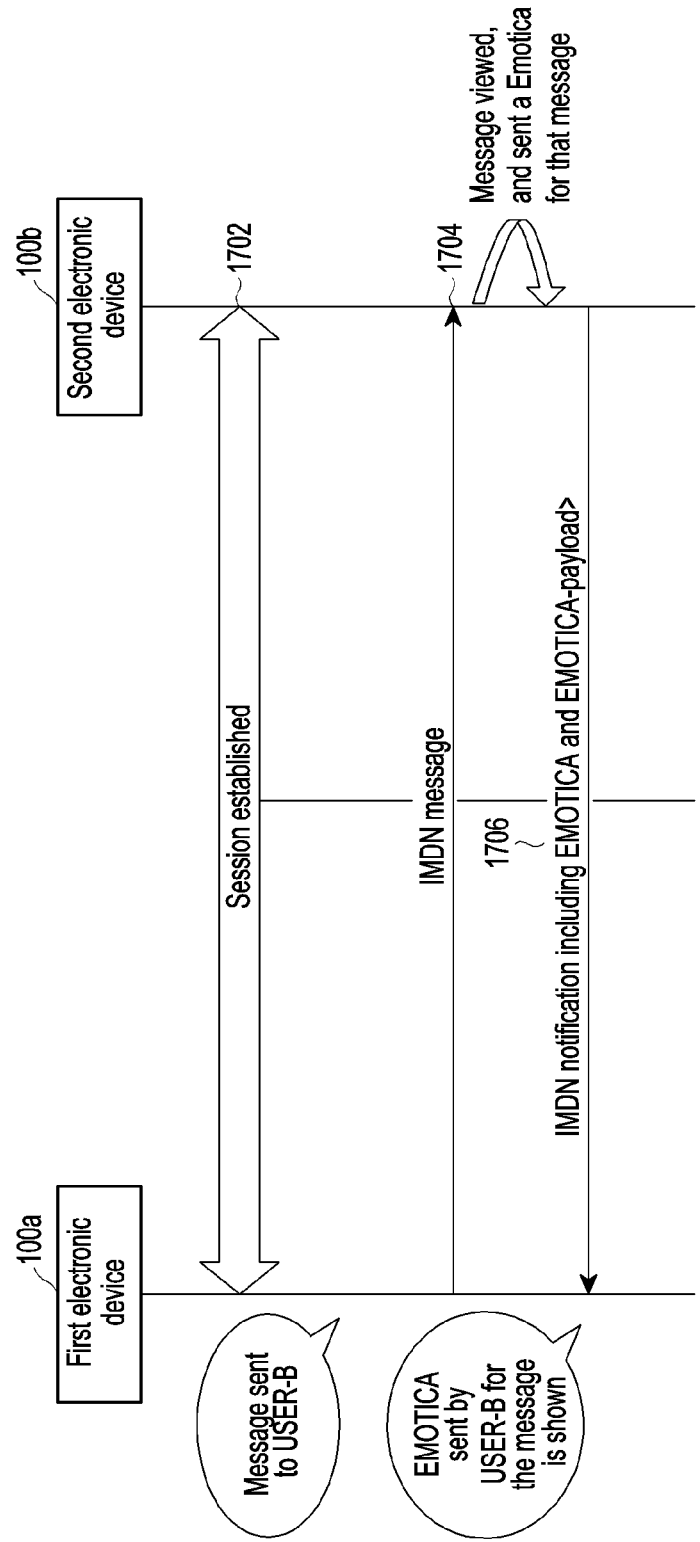
FIG. 17 is a sequential diagram illustrating various operations involved in providing IMDN messages for the emoticons, according to the embodiments as disclosed herein.

FIG. 17 is a sequential diagram illustrating various operations involved in providing IMDN messages for the emoticons, according to the embodiments as disclosed herein. At 1702, the communication session is established between the first electronic device 100*a* and the second electronic device 100*b*. At 1704, the user of the first electronic device 100*a* sends the IMDN message to the second electronic device 100*b*. The user can receive the emoticons from the other end, for the messages he/she sent. This emoticons from the second electronic device 100*b* for each sent/received message can be delivered using the extended IMDN method at 1706.

Figure 18:
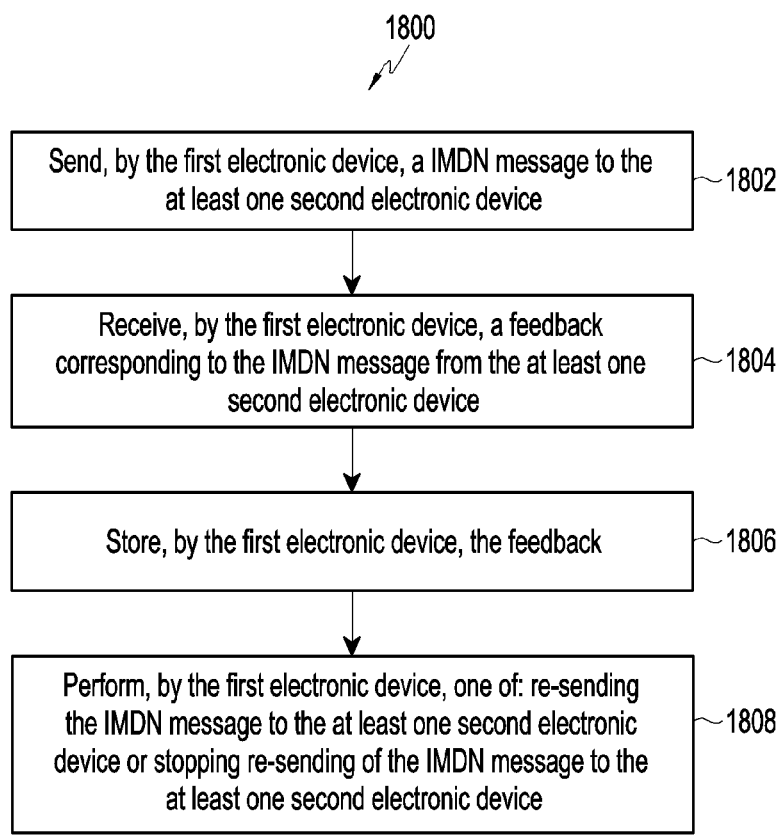
FIG. 18 is a flow diagram illustrating various operations, implemented by the first electronic device, for handling the IMDN message in the RCS system, while managing forward message in the RCS system, according to the embodiments as disclosed herein.

FIG. 18 is a flow diagram 1800 illustrating various operations, implemented by the first electronic device 100*a*, for handling the IMDN message in the RCS system, while managing forward message in the RCS system, according to the embodiments as disclosed herein. The operations (1802-1808) are performed by the RCS handler 110. At 1802, the method includes sending, by the first electronic device 100*a*, the IMDN message (e.g., forward message) to the at least one second electronic device 100*b*-100*n*. At 1804, the method includes receiving, by the first electronic device 100*a*, the feedback corresponding to the IMDN message from the at least one second electronic device 100*b*-100*n*. The feedback includes at least one of correctness information associated with the IMDN message, context associated with the IMDN message, an emotional response associated with the IMDN message and an opinion related to the IMDN message. At 1806, the method includes storing, by the first electronic device 100a, the feedback. At 1808, the method includes performing, by the first electronic device 100a, one of: re-sending the IMDN message to the at least one second electronic device 100b-100n or stopping re-sending of the IMDN message to the at least one second electronic device 100b-100n based on the feedback. For the sake of clarity, the proposed method is explained in the forward message scenario. Similarly, the proposed method can also be implemented in the normal messaging service as well.

The various actions, acts, blocks, steps, or the like in the flow diagram 1800 may be performed in the order presented, in a different order or simultaneously. Further, in some embodiments, some of the actions, acts, blocks, steps, or the like may be omitted, added, modified, skipped, or the like without departing from the scope of the invention.

Figure 19:
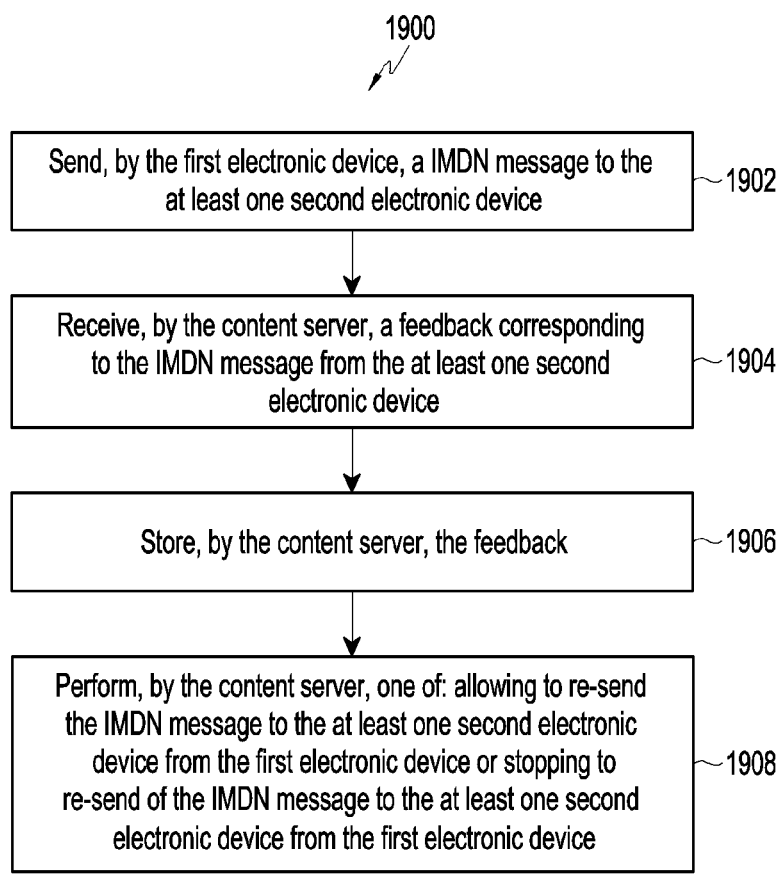
FIG. 19 is a flow diagram illustrating various operations, implemented by the system, for handling the IMDN message in the RCS system, while managing forward message in the RCS system, according to the embodiments as disclosed herein.

FIG. 19 is a flow diagram 1900 illustrating various operations, implemented by the system 100, for handling the IMDN message in the RCS system, while managing forward message in the RCS system, according to the embodiments as disclosed herein. The operations (1902-1908) are performed by the RCS handler 110. At 1902, the method includes sending, by the first electronic device 100a, the IMDN message to the at least one second electronic device 100b-100n. At 1904, the method includes receiving, by the content server 200, the feedback corresponding to the IMDN message from the at least one second electronic device 100b-100n. At 1906, the method includes storing, by the content server 200, the feedback. At 1908, the method includes performing, by the content server 200, one of: allowing to re-send the IMDN message to the at least one second electronic device 100b-100n from the first electronic device 100a or stopping to re-send of the IMDN message to the at least one second electronic device 100b-100n from the first electronic device 100a. For the sake of clarity, the proposed method is explained in the forward message scenario. Similarly, the proposed method can also be implemented in the normal messaging service as well.

The various actions, acts, blocks, steps, or the like in the flow diagram 1900 may be performed in the order presented, in a different order or simultaneously. Further, in some embodiments, some of the actions, acts, blocks, steps, or the like may be omitted, added, modified, skipped, or the like without departing from the scope of the invention.

Figure 20:
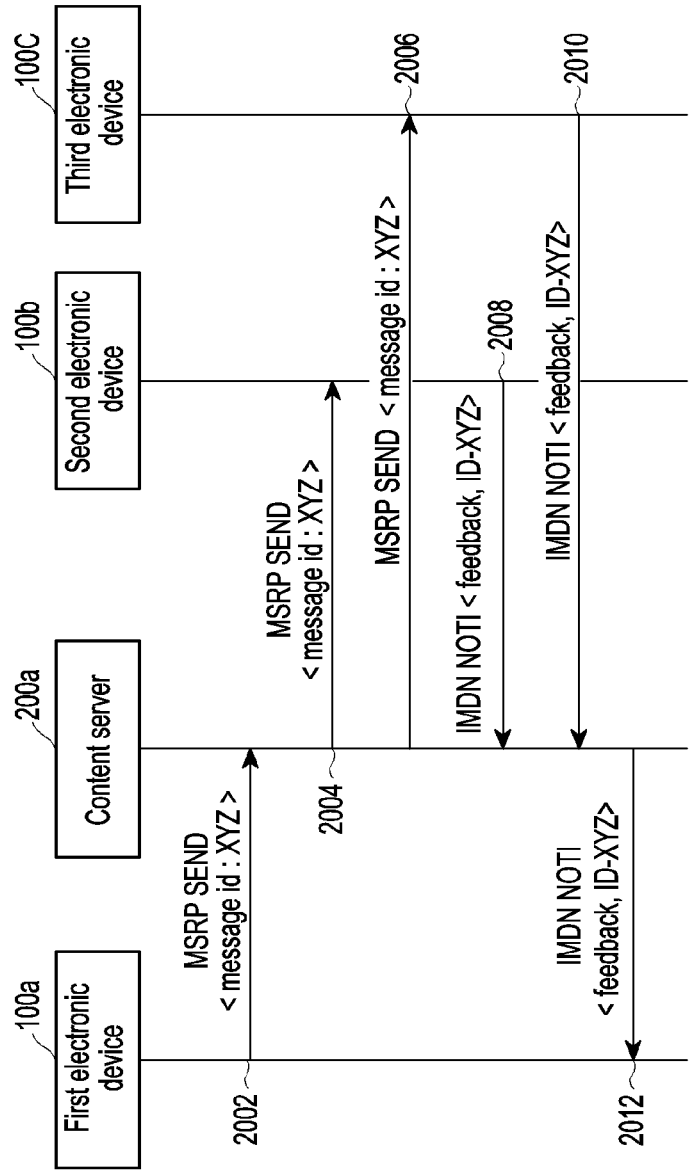
FIG. 20 is a sequential diagram illustrating various operations involved in managing forward message in the RCS system, according to the embodiments as disclosed herein.

FIG. 20 is a sequential diagram illustrating various operations involved in managing forward message in the RCS system, according to the embodiments as disclosed herein.

At 2002, the first electronic device sends the message to the content server 200. At 2004 and at 2006, the content server 200 forwards the message to the second electronic device 100b and third electronic device 100c, respectively. Based on the message, the second electronic device 100b and third electronic device 100c respectively sends the feedback to the content server 200 at 2008 and at 2010. At 2012, the content server 200 forwards the feedback to the first electronic device 100a.

In an embodiment, the IMDN message can be used to get a feedback about the message shared by the user to the group of participants. Assume, the user of the first electronic device 100a sent a forward message in the group, the participants in the group can express their opinions about the forward message by sending the feedback to the message. The opinions can be sent to the first electronic device 100a, so that the user of the electronic device 100a will come to know the response for the message. Based on the response, the user of the electronic device 100a can decide to forward that message to further people or not.

In another embodiment, the feedbacks can be stored in the content server 200 against the forward message shared by the user of the first electronic device 100a. Based on the response from the participants, the content server 200 can use this opinions to take some decisions (Like, if there are too many negative sentiment for the message, the content server 200 can restrict that message from further forwarding, even if the user forwards that message).

In an example, the user of the first electronic device 100a forwards the message to the users of the second electronic devices 100b and 100c, these users of the second electronic device 100b and 100c does not agree to the contents of the message sent by the user of the first electronic device 100a, hence users of the second electronic devices 100b and 100c provides feedback (i.e., vote down (dis-agree)) for the message. This information will be stored in the content server 200 and notified to the user of the first electronic device 100a, so that the user of the first electronic device 100a can restrict himself from forwarding further. In another example, the content server 200 also can take some decision based on the feedbacks such as including a representative summary of the stored feedback during forwarding the message further. In yet another embodiment, the content server 200 also can provide the representative summary of the stored feedback to the second electronic devices 100b and 100c to show a trend of feedbacks for the message.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for handling an instant message disposition notification (IMDN) message in a rich communication service (RCS) system, comprising:
   receiving, by a first electronic device, a content from at least one second electronic device;
   displaying, by the first electronic device, the content;
   deleting, by the first electronic device, the content; and
   sending, by the first electronic device, an IMDN restore message to restore a content deleted by the first electronic device to at least one second electronic device,
   wherein the IMDN restore message comprises an IMDN type with an original IMDN identifier of the deleted content.

2. The method of claim 1, further comprising:
   receiving, by the first electronic device, the deleted content from the at least one second electronic device; and
   sending, by the first electronic device, a notification indicating restoration of the deleted content to the at least one second electronic device.

3. The method of claim 1, further comprising:
sending, by the first electronic device, an RCS message to the at least one second electronic device;
receiving, by the first electronic device, a first IMDN message, from the at least one second electronic device, indicating that the RCS message is unread at the at least one second electronic device;
modifying, by the first electronic device, the RCS message;
sending, by the first electronic device, the modified RCS message to the at least one second electronic device; and
receiving, by the first electronic device, a second IMDN message, from the at least one second electronic device, indicating that the modified RCS message is delivered to the at least one second electronic device.

4. The method of claim 3, wherein modifying, by the first electronic device, the RCS message comprises:
determining, by the first electronic device, an IMDN identifier and an original header associated with the RCS message; and
modifying, by the first electronic device, content of the RCS message by adding a new header sequence indicating a same IMDN identifier associated with the RCS message in the modified RCS message.

5. The method of claim 1, further comprising:
receiving, by the first electronic device, an IMDN message including at least one emoticon from the at least one second electronic device; and
displaying, by the first electronic device, the IMDN message including the at least one emoticon.

6. The method of claim 1, further comprising:
sending, by the first electronic device, a poll message to the at least one second electronic device, wherein the poll message comprises a plurality of options;
receiving, by the first electronic device, a poll response comprising at least one option selected from the plurality of options from each of the at least one second electronic device; and
publishing, by the first electronic device, the at least one selected option from each of the at least one second electronic device by sending an IMDN message comprising the at least one selected option to the at least one second electronic device.

7. The method of claim 1, further comprising:
sending, by the first electronic device, a IMDN message to the at least one second electronic device;
receiving, by the first electronic device, a feedback corresponding to the IMDN message from the at least one second electronic device, wherein the feedback comprises at least one of correctness information associated with the IMDN message, context associated with the IMDN message, an emotional response associated with the IMDN message and an opinion related to the IMDN message;
storing, by the first electronic device, the feedback; and
performing, by the first electronic device, one of: re-sending the IMDN message to the at least one second electronic device, or stopping re-sending of the IMDN message to the at least one second electronic device based on the feedback.

8. The method of claim 1, further comprising: sending, by the first electronic device, an IMDN message to the at least one second electronic device through a content server.

9. A system for handling an instant message disposition notification (IMDN) message in a rich communication service (RCS) system, comprising:
a first electronic device configured to communicate with at least one second electronic device,
wherein the first electronic device is configured to:
receive a content from at least one second electronic device,
display the content,
delete the content, and
send an IMDN restore message to restore the content deleted by the first electronic device to the at least one second electronic device, and wherein the IMDN restore message comprises an IMDN type with an original IMDN identifier of the deleted content.

10. The system of claim 9, wherein the first electronic device is configured to:
receive the deleted content from the at least one second electronic device; and
send a notification indicating restoration of the deleted content to the at least one second electronic device.

11. The system of claim 9 wherein the first electronic device is configured to:
send an RCS message to the at least one second electronic device;
receive a first IMDN message, from the at least one second electronic device, indicating that the RCS message is unread at the at least one second electronic device;
modify the RCS message;
send the modified RCS message to the at least one second electronic device; and
receive a second IMDN message, from the at least one second electronic device, indicating that the modified RCS message is delivered to the at least one second electronic device.

12. The system of claim 11, wherein modifying the RCS message comprises:
determining an IMDN identifier and an original header associated with the RCS message; and
modifying content of the RCS message by adding a new header sequence indicating a same IMDN identifier associated with the RCS message in the modified RCS message.

13. The system of claim 9, wherein the first electronic device is configured to:
receive the IMDN message including at least one emoticon from the at least one second electronic device; and
the first electronic device configured to display the IMDN message including the at least one emoticon.

14. The system of claim 9, wherein the first electronic device is configured to:
send a poll message to the at least one second electronic device, wherein the poll message comprises a plurality of options;
receive a poll response comprising at least one option selected from the plurality of options from each of the at least one second electronic device; and
publish the at least one selected option from each of the at least one second electronic device by sending an IMDN message comprising the at least one selected option to the at least one second electronic device.

15. The system of claim 9, wherein the first electronic device is configured to:
send a IMDN message to the at least one second electronic device;
receive a feedback corresponding to the IMDN message from the at least one second electronic device, wherein the feedback comprises at least one of correctness information associated with the IMDN message, context associated with the IMDN message, an emotional response associated with the IMDN message and an opinion related to the IMDN message;

store the feedback; and perform one of: re-send the IMDN message to the at least one second electronic device, or stop re-sending of the IMDN message to the at least one second electronic device based on the feedback.

\* \* \* \* \*